(12) United States Patent
Benazzi et al.

(10) Patent No.: US 7,250,106 B2
(45) Date of Patent: Jul. 31, 2007

(54) FLEXIBLE PROCESS FOR THE PRODUCTION OF OIL BASES AND MIDDLE DISTILLATES WITH A CONVERTING PRETREATMENT STAGE FOLLOWED BY A CATALYTIC DEWAXING STAGE

(75) Inventors: Eric Benazzi, Chatou (FR); Patrick Euzen, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 449 days.

(21) Appl. No.: 10/696,548

(22) Filed: Oct. 30, 2003

(65) Prior Publication Data

US 2005/0000857 A1    Jan. 6, 2005

(30) Foreign Application Priority Data

Oct. 30, 2002    (FR) ................... 02 13638

(51) Int. Cl.
*C10G 51/02*    (2006.01)
(52) U.S. Cl. ............... 208/49; 208/28; 208/58; 502/66; 585/264
(58) Field of Classification Search ............ 208/28, 208/49, 58; 502/66; 585/264
See application file for complete search history.

(56) References Cited

U.S. PATENT DOCUMENTS

| | | | |
|---|---|---|---|
| 3,471,399 A | 10/1969 | O'Hara | |
| 3,925,197 A | 12/1975 | Dautzenberg | |
| 4,051,021 A | 9/1977 | Hamner | |
| 4,134,856 A | 1/1979 | Itoh et al. | |
| 4,837,193 A | 6/1989 | Keiji et al. | |
| 5,951,848 A * | 9/1999 | Baker et al. ............. | 208/28 |
| 5,965,475 A * | 10/1999 | Wittenbrink et al. ...... | 502/66 |
| 5,968,344 A | 10/1999 | Bellussi et al. | |
| 6,231,750 B1 | 5/2001 | Kasztelan et al. | |
| 6,884,339 B2 * | 4/2005 | Benazzi et al. .......... | 208/58 |

FOREIGN PATENT DOCUMENTS

| | | |
|---|---|---|
| FR | 2780309 A | 12/1999 |
| WO | WO 9819791 A | 5/1998 |
| WO | WO 01/81508 A1 * | 11/2001 |

* cited by examiner

*Primary Examiner*—Glenn A. Caldarola
*Assistant Examiner*—Prem C. Singh
(74) *Attorney, Agent, or Firm*—Millen, White, Zelano & Branigan, P.C.

(57) ABSTRACT

For the production of high quality base oils with production of high quality middle distillates, feedstocks are obtained from the distillation of crude or from units for transformation and refining of the latter, there are provided a converting pretreatment stage of the feedstock and a catalytic dewaxing stage. The converting pretreatment stage occurs in the presence of a catalyst containing at least one noble metal deposited on an acid substrate in particular silica-alumina, to effect hydrocracking and hydroisomerization reactions. The catalytic dewaxing occurs in the presence of a catalyst with a zeolite base that is preferably selected from zeolites of the TON-structural type (theta-1, ISI-1, ZSM-22, KZ-2, NU-10), and the zeolites ZSM-48, ZBM-30, EU-2, EU-11, ferrierite, EU-1 and EU-13, and the catalyst also contains at least one hydro-dehydrogenating element.

16 Claims, 2 Drawing Sheets

FLEXIBLE PROCESS FOR THE PRODUCTION OF OIL BASES AND MIDDLE DISTILLATES WITH A CONVERTING PRETREATMENT STAGE FOLLOWED BY A CATALYTIC DEWAXING STAGE

The invention relates to an improved process for the production of very high quality base oils with simultaneous production of high quality middle distillates starting from feedstocks that are obtained from the distillation of crude or that are obtained from units for transformation and refining of the latter, with the exclusion of paraffins that are obtained from the Fischer-Tropsch process. The process according to the invention comprises a converting pretreatment stage of the feedstock and a catalytic dewaxing stage.

The converting pretreatment stage takes place in the presence of a catalyst that contains at least one noble metal that is deposited on an acid substrate that is a particular silica-alumina.

The catalytic dewaxing takes place in the presence of a catalyst with a zeolite base that is selected from the group that is formed by zeolites of the TON-structural type (theta-1, ISI-1, ZSM-22, KZ-2, NU-10), and the zeolites ZSM-48, ZBM-30, EU-2, EU-11, ferrierite, EU-1 and EU-13, whereby the catalyst also contains at least one hydro-dehydrogenating element.

PRIOR ART

High quality lubricants have an essential importance for good operation of modern machines, automobiles, and trucks.

These lubricants are most often obtained by a series of refining stages that allow the improvement of the properties of a petroleum fraction. In particular, a treatment of heavy petroleum fractions with high contents of linear or slightly branched paraffins is necessary to obtain good quality base oils with the best possible yields, by an operation that aims at eliminating the linear or very slightly branched paraffins, of the feedstocks that will then be used as base oils.

Actually, the paraffins of high molecular weight that are linear or very slightly branched and that are present in the oils give rise to high pour points and therefore to solidification phenomena for low-temperature applications. To reduce the values of the pour points, these linear paraffins that may or may not be very slightly branched should be completely or partially eliminated.

Another means is the catalytic treatment with or without the presence of hydrogen, and, taking into account their shape selectivity, the zeolites are among the most used catalysts.

Catalysts with a zeolite base, such as ZSM-5, ZSM-11, ZSM-12, ZSM-22, ZSM-23, ZSM-35 and ZSM-38, have been described for their use in these processes.

All of the catalysts that are currently used in the pretreatment stage are of the bifunctional type combining an acid function with a hydrogenating function. The acid function is provided by large-surface substrates (generally 150 to 800 $m^2 \cdot g^{-1}$) that exhibit a surface acidity, such as the halogenated aluminas (chlorinated or fluorinated in particular), phosphorus-containing aluminas, combinations of boron and aluminum oxides, amorphous silica-aluminas and silica-aluminas. The hydrogenating function is provided either by one or by several metals of group VIII of the periodic table, such as iron, cobalt, nickel, ruthenium, rhodium, palladium, osmium, iridium and platinum, or by a combination of at least one metal of group VI, such as chromium, molybdenum and tungsten, and at least one metal of group VIII.

The equilibrium between the two acid and hydrogenating functions is the basic parameter that controls the activity and the selectivity of the catalyst. A weak acid function and a strong hydrogenating function provide catalysts that are not very active and selective with regard to the isomerization, whereas a strong acid function and a weak hydrogenating function provide catalysts that are very active and selective with regard to cracking. A third possibility is to use a strong acid function and a strong hydrogenating function so as to obtain a catalyst that is very active but also very selective with regard to isomerization. It is therefore possible, by careful selection of each of the functions, to adjust the activity/selectivity pair of the catalyst.

The applicant therefore proposes, according to the process that is described in the invention, to produce jointly very good quality middle distillates and oil bases of VI with a pour point that is at least equal to those obtained with a hydrorefining and/or hydrocracking process.

DETAILED DESCRIPTION OF THE INVENTION

Techniques of Characterization

In the following presentation of the invention, specific surface area is defined as the B.E.T. specific surface area that is determined by nitrogen adsorption according to ASTM Standard D 3663-78 established from the BRUNAUER-EMMETT-TELLER method described in the periodical "The Journal of America Society," 60, 309, (1938).

In the following presentation of the invention, mercury volume of the substrates and catalysts is defined as the volume that is measured by mercury porosimeter intrusion according to the ASTM Standard D4284-83 at a maximum pressure of 4000 bar, using a surface tension of 484 dyne/cm and a contact angle for the amorphous silica-alumina substrates of 140°. The mean mercury diameter is defined as being a diameter such that all of the pores of a size less than this diameter constitute 50% of pore volume ($V_{Hg}$) in an interval encompassed between 36 Å and 1000 Å. One of the reasons for which it is preferable to use the substrate as a base to define the pore distribution resides in the fact that the contact angle of the mercury varies after impregnation of metals based on the nature and the type of metals. The wetting angle was assumed to be equal to 140° by following the recommendations of the work "Techniques de l'ingénieur, traité analyse et caractérisation [Engineering Techniques, Analytical Treatise and Characterization]," P 1050-5, written by Jean Charpin and Bernard Rasneur.

To obtain a better precision, the value of the mercury volume in ml/g that is provided in the text below corresponds to the value of the total mercury volume in ml/g measured in the sample minus the value of the mercury volume in ml/g that is measured in the same sample for a precision corresponding to 30 psi (about 2 bar). The mean mercury diameter is also defined as being a diameter such that all of the pores of a size less than this diameter constitute 50% of the total mercury pore volume.

Finally, to better characterize the pore distribution, the following pore distribution criteria in terms of mercury are defined: volume V1 corresponds to the volume that is contained in the pores whose diameter is less than the mean diameter minus 30 Å. Volume V2 corresponds to the volume that is contained in the pores with diameters that are greater than or equal to the mean diameter minus 30 Å and less than the mean diameter plus 30 Å. Volume V3 corresponds to the volume that is contained in the pores with diameters that are more than or equal to the mean diameter plus 30 Å. Volume V4 corresponds to the volume that is contained in the pores whose diameters are less than the mean diameter minus 15 Å. Volume V5 corresponds to the volume that is contained in the pores with diameters that are greater than or equal to the mean diameter minus 15 Å and less than the mean diameter plus 15 Å. Volume V6 corresponds to the volume that is contained in the pores with diameters that are greater than or equal to the mean diameter plus 15 Å.

The pore distribution that is measured by nitrogen adsorption was determined by the Barrett-Joyner-Halenda (BJH) model. The nitrogen adsorption-desorption isotherm according to the BJH model is described in the periodical "The Journal of American Society," 73, 373, (1951) written by E. P. Barrett, L. G. Joyner and P. P. Halenda. In the following presentation of the invention, nitrogen adsorption volume is defined as the measured volume for $P/P_o=0.99$, pressure for which it is assumed that nitrogen filled all the pores. The nitrogen desorption mean diameter is defined as being a diameter such that all of the pores that are smaller than this diameter constitute 50% of the pore volume (Vp) measured on the desorption branch of the nitrogen isotherm.

Adsorption surface area means the surface area that is measured on the branch of the adsorption isotherm. Reference will be made to, for example, the article by A. Lecloux "Mémoires Société Royale des Sciences de Liège, $6^{\grave{e}me}$ série [$6^{th}$ Series], Tome I [Volume 1], fasc. 4 [Section 4], pp. 169-209 (1971)."

The sodium content was measured by atomic absorption spectrometry. An air-acetylene flame is used.

X diffraction is a technique that can be used to characterize the substrates and catalysts according to the invention. In the following presentation, the analysis of x rays is carried out on powder with a Philips PW 1830 diffractometer that operates in reflection and is equipped with a rear monochromator by using CoKalpha radiation ($\lambda K_{\alpha 1}=1.7890$ Å, $\lambda 1 K_{\alpha 2}=1.793$ Å, intensity ratio $K_{\alpha 1}/K_{\alpha 2}=0.5$). For the X diffraction diagram of the gamma-alumina, reference will be made to the ICDD data base, form 10-0425. In particular, the two most intense peaks are located at a position that corresponds to one d encompassed between 1.39 and 1.40 Å and one d encompassed between 1.97 Å to 2.00 Å. D is called the interreticular distance that is derived from the angular position by using Bragg's equation ($2\ d_{(hkl)}*\sin(\theta)=\eta*\lambda$). Gamma-alumina is defined in the text below, i.a., as, for example, an alumina contained in the group that consists of cubic gamma-aluminas, pseudo-cubic gamma-aluminas, tetragonal gamma-aluminas, poorly or slightly crystallized gamma-aluminas, large-surface gamma-aluminas, low-surface gamma-aluminas, gamma-aluminas that are obtained from coarse boehmite, gamma-aluminas that are obtained from crystallized boehmite, gamma-aluminas that are obtained from boehmite that is slightly or poorly crystallized, gamma-aluminas that are obtained from a mixture of crystallized boehmite and an amorphous gel, gamma-aluminas that are obtained from an amorphous gel, and gamma-aluminas evolving toward delta. For the positions of diffraction peaks of eta, delta and theta aluminas, it is possible to refer to the article by B. C. Lippens and J. J. Steggerda in Physical and Chemical Aspects of Adsorbents and Catalysts, E. G. Linsen (Ed.), Academic Press, London. 1970, pp. 171-211.

For the substrates and catalysts according to the invention, the X diffraction diagram demonstrates a wide peak that is characteristic of the presence of amorphous silica.

Furthermore, in the entire text that follows, the alumina compound can contain an amorphous fraction that is difficult to detect by the DRX techniques. It will therefore be understood below that the alumina compounds that are used or described in the text can contain an amorphous or poorly crystallized fraction.

The substrates and catalysts according to the invention have been analyzed by NMR MAS of the solid of $^{27}$Al on a spectrometer of the Brücker Company such as MSL 400, with a 4 mm probe. The speed of rotation of the samples is on the order of 11 kHz. Potentially, the NMR of the aluminum makes it possible to distinguish three types of aluminum whose chemical displacements are presented below:

Between 100 and 40 ppm, tetra-coordinated-type aluminum, denoted as $Al_{IV}$,

Between 40 and 20 ppm, penta-coordinated-type aluminum, denoted as $Al_V$,

Between 20 and −100 ppm, hexa-coordinated-type aluminum, denoted as $Al_{VI}$.

The aluminum atom is a quadripolar core. Under certain analysis conditions (weak radiofrequency fields: 30 kHz, low-impulse angle: π/2 and water-saturated sample), the NMR technique of magic angle rotation (MAS) is a quantitative technique. The decomposition of the NMR MAS spectra makes it possible to gain access directly to the amount of different radicals. The spectrum is locked in chemical displacement relative to a 1 M solution of aluminum nitrate. The aluminum signal is at zero ppm. We chose to integrate the signals between 100 and 20 ppm for the $Al_{IV}$ and $Al_V$, which corresponds to area 1, and presentation of the invention, proportion of octahedral $Al_{VI}$ is defined as the following ratio:

area 2/(area 1+area 2).

A method of characterization of the substrates and catalysts according to the invention that can be used is transmission electronic microscopy (MET). For this purpose, an electronic microscope (such as Jeol 2010 or Philips Tecna120F, optionally with scanning) that is equipped with an energy dispersion spectrometer (EDS) for x-ray analysis (for example a Tracor or an Edax) is used. The EDS detector should make possible the detection of light elements. The combination of these two tools, MET and EDS, makes it possible to combine the imagery and the local chemical analysis with a good spatial resolution.

For this type of analysis, the samples are finely ground in the dry state in a mortar; the powder is then included in the resin to produce ultrafine fractions with a thickness of about 70 nm. These fractions are collected on Cu grids that are covered by an amorphous carbon film with holes used as a substrate. They are then introduced into the microscope for observation and analysis under secondary vacuum. By imagery, the sample zones are then easily distinguished from the resin zones. A certain number of analyses, 10 at a minimum, preferably between 15 and 30, are then initiated on different zones of the industrial sample. The size of the electronic beam for the analysis of the zones (approximately determining the size of the analyzed zones) is 50 nm of diameter at a maximum, preferably 20 nm, even more preferably 10, 5, 2 or 1 nm of diameter. In the scanned mode, the analyzed zone will be based on the size of the scanned zone and no longer on the size of the beam, which is generally reduced.

The semi-quantitative treatment of X spectra collected with the help of the EDS spectrometer makes it possible to obtain the relative concentration of A and Si (in % atomic) and the Si/Al ratio for each of the analyzed zones. It is then possible to calculate the $Si/Al_m$ mean and the standard deviation σ of this set of measurements.

In the non-limiting examples of the following presentation of the invention, the 50 nm probe is the probe that is used to characterize the substrates and catalysts according to the invention, unless otherwise indicated.

The packing density (DRT) is measured in the manner that is described in the work "Applied Heterogeneous Catalysis" by J. F. Le Page, J. Cosyns, P. Courty, E. Freund, J.-P. Franck, Y. Jacquin, B. Juguin, C. Marcilly, G. Martino, J. Miguel, R. Montanrnal, A. Sugier, H. Van Landeghem, Technip. Paris, 1987. A graduated cylinder with acceptable dimensions is filled with catalyst or substrate by successive additions; and between each addition, the catalyst (or the substrate) is packed by shaking the cylinder until a constant volume is achieved. This measurement is generally carried out on 1000 cm³ of catalyst or substrate packed into a cylinder whose height to diameter ratio is close to 5:1. This measurement can preferably be made on automated devices such as Autotap® that is marketed by Quantachrome®.

The acidity of the matrix is measured by infra-red (IR) spectrometry. The IR spectra are recorded on a Nicolet interferometer such as Nexus-670 under a resolution of 4 $cm^{-1}$ with a Happ-Genzel-type apodization. The sample (20 mg) is pressed in the form of a self-supported pellet, then is placed in an in-situ analysis cell (25° C. to 550° C., furnace offset from the IR beam, secondary vacuum of $10^{-6}$ mbar). The diameter of the pellet is 16 min.

The sample is pretreated in the following way to eliminate the physisorbed water and to dehydroxylate partially the surface of the catalyst to obtain a representative image of the acidity of the catalyst in use:

increase in temperature from 25° C. to 300° C. in 3 hours
plateau of 10 hours at 300° C.
drop in temperature from 300° C. to 25° C. in 3 hours.

The basic probe (pyridine) is then adsorbed with saturating pressure at 25° C. and then thermo-desorbed according to the following plateaus:

25° C. for 2 hours under secondary vacuum
100° C. for 1 hour under secondary vacuum
200° C. for 1 hour under secondary vacuum
300° C. for 1 hour under secondary vacuum.

A spectrum is recorded at 25° C. at the end of the pretreatment and at each desorption plateau in transmission mode with an accumulation time of 100 s. The spectra are set to iso-mass (i.e., assumed to be at iso-thickness) (20 mg exactly). The number of Lewis sites is proportional to the surface area of the peak whose maximum lies around 1450 $cm^{-1}$, including any shoulder. The number of Bronsted sites is proportional to the surface area of the peak whose maximum is located toward 1545 $cm^{-1}$. The ratio of the number of Bronsted sites/number of Lewis sites (B/L) is estimated to be equal to the ratio of the surfaces of two peaks described above. The surface of peaks at 25° C. is generally used. This B/L ratio is generally calculated from the spectrum that is recorded at 25° C. at the end of the pretreatment.

OBJECT OF THE INVENTION

The applicant put research efforts into the development of an improved process for the production of very high quality lubricating oils and high quality middle distillates starting from hydrocarbon-containing feedstocks and preferably starting from distillates that are obtained from the direct distillation of crude or from conversion units such as FCC, coker or visbreaking, or obtained from units for extraction of aromatic compounds, or obtained from desulfurization or hydroconversion of RAT (atmospheric residues) and/or RSV (vacuum residues), or else the feedstock can be a deasphalted oil, or else a hydrocracking residue, for example, obtained from a hydrocracking stage, a vacuum distillate that has undergone a hydrorefining stage, and more generally bases for lubricating oils, or else polyalpha-olefins with a high pour point or any mixture of the feedstocks cited above, whereby the paraffins that are obtained from the Fischer-Tropsch process are excluded.

In general, the feedstocks that are suitable for the target oils have an initial boiling point of at least 340° C., and better yet at least 370° C.

This invention therefore relates to a scheme of processes for the joint production of very high quality base oils and very high quality middle distillates (gas oils in particular) starting from petroleum fractions. The oils that are obtained have a high viscosity index (VI), low volatility, good UV stability and a low pour point.

More specifically, the invention relates to a process for the production of oils starting from a hydrocarbon-containing feedstock (of which preferably at least 20% by volume has a boiling point of at least 340° C.), whereby said process comprises the following successive stages:

(a) converting pretreatment of the feedstock, whereby said feedstock has a sulfur content that is less than 1000 ppm by weight, a nitrogen content that is less than 200 ppm by weight, a metal content that is less than 50 ppm by weight, whereby said stage takes place at a temperature of 200-500° C., under a pressure of 5-25 MPa, with a volumetric flow rate of 0.1-5 $h^{-1}$, in the presence of hydrogen, and in the presence of a bifunctional catalyst that is prepared by any technique that is known to one skilled in the art that contains at least one noble metal of group VIII that is deposited on a non-zeolitic silica-alumina-based substrate that has a silica ($SiO^2$) content by mass that is more than 5% by weight and less than or equal to 95% by weight, whereby said catalyst has the following characteristics:

a mean pore diameter, measured by mecury porosimetry, encompassed between 20 and 140 Å,
a total pore volume, measured by mercury porosimetry, encompassed between 0.1 ml/g and 0.6 ml/g,
a total pore volume, measured by nitrogen porosimetry, encompassed between 0.1 ml/g and 0.6 ml/g,
a BET specific surface area encompassed between 100 and 550 m²/g,
a pore volume, measured by mercury porosimetry, encompassed in the pores with diameters of more than 140 Å, of less than 0.1 ml/g,
a pore volume, measured by mercury porosimetry, encompassed in the pores with diameters of more than 160 Å, of less than 0.1 ml/g,
a pore volume, measured by mercury porosimetry, encompassed in the pores with diameters of more than 200 Å, of less than 0.1 ml/g,
a pore volume, measured by mercury porosimetry, encompassed in the pores with diameters of more than 500 Å, of less than 0.01 ml/g,
an X diffraction diagram that contains at least the main lines that are characteristic of at least one of the transition aluminas contained in the group that consists of the alpha, rho, chi, eta, gamma, kappa, theta and delta aluminas.

(b) catalytic dewaxing of at least a portion of the effluent that is obtained from stage a), carried out at a temperature of 200-500° C., under a pressure of 1-25 MPa, with an hourly volumetric flow rate of 0.05-50 $h^{-1}$, in the presence of 50-2000 liters of hydrogen/liter of effluent that enters stage b and in the presence of a catalyst that comprises at least one hydro-dehydrogenating element and at least one molecular sieve.

Pretreatment Stage (a)

The characteristics of the pretreatment catalyst are as follows:

a non-zeolitic silica-alumina-type (i.e., that comprises silica and alumina) substrate with a content by mass of silica ($SiO_2$) that is more than 5% by weight and less than or equal to 95% by weight, preferably between 10 and 80% by weight, preferably a silica content that is more than 20% by weight and less than 80% by weight, and even more preferably more than 25% by weight and less than 75% by weight, and the silica content is advantageously encompassed between 10 and 50% by weight, preferably a cationic impurity content that is less than 0.1% by weight, preferably less than 0.05% by weight, and even more preferably less than 0.025% by weight. Cationic impurity content is defined as the total alkaline content, preferably an anionic impurity content that is less than 1% by weight, preferably less than 0.5% by weight, and even more preferably less than 0.1% by weight.

The silica-alumina that is used in the process according to the invention is preferably a silica-alumina that is homogeneous on the micrometer scale and in which the cationic impurity content (for example $Na^+$) is less than 0.1% by weight, preferably less than 0.05% by weight, and even more preferably less than 0.025% by weight, and the anionic impurity content (for example $SO_4^{2-}$, $Cl^-$) is less than 1% by weight, preferably less than 0.5% by weight, and even more preferably less than 0.1% by weight.

Thus, any silica-alumina synthesis process that is known to one skilled in the art that leads to a silica-alumina that is homogeneous on the micrometer scale and in which the cationic impurities (for example, $Na^+$) can be set at less than 0.1%, preferably to a content that is less than 0.05% by weight, and even more preferably to a content that is less than 0.025% by weight and in which the anionic impurities (for example $SO_4^{2-}$, $Cl^-$) can be set at less than 1% and more preferably to a content that is less than 0.05% by weight, is suitable for preparing the substrates that are the object of the invention:

at least one hydro-dehydrogenating element that is selected from the group that is formed by the noble elements of group VIII of the periodic table, preferably a content by mass of noble metals of group VIII, in metallic form or in oxide form, of between 0.05 and 10% by weight, preferably between 0.1 and 5%, and even more preferably between 0.1 and 2%, optionally at least one dopant that is deposited on a catalyst and selected from the group that is formed by phosphorus, boron and silicon. The contents by mass of boron, silicon, and phosphorus in the form of oxides are between 0.1 and 15%, preferably between 0.1 and 10% and still more advantageously between 0.1 and 5% by weight. Dopant is defined as an element that is introduced after the preparation of the silico-aluminum substrate that is described above, a mean pore diameter, measured by mercury porosimetry, encompassed between 20 and 140 Å, preferably between 40 and 120 Å, and even more preferably between 50 and 100 Å, preferably a ratio between volume V2, measured by mercury porosimetry, encompassed between $D_{mean}$−30 Å and $D_{mean}$+30 Å, to the total pore volume also measured by mercury porosimetry, that is more than 0.6, preferably more than 0.7, and even more preferably more than 0.8, preferably a volume V3 that is encompassed in the pores with diameters of greater than $D_{mean}$+30 Å, measured by mercury porosimetry, that is less than 0.1 ml/g, preferably less than 0.06 ml/g, and even more preferably less than 0.04 ml/g, preferably a ratio between volume V5 that is encompassed between $D_{mean}$−15 Å and $D_{mean}$+15 Å, measured by mercury porosimetry, and volume V2 that is encompassed between $D_{mean}$−30 Å and $D_{mean}$+30 Å, measured by mercury porosimetry, that is more than 0.6, preferably more than 0.7, and even more preferably more than 0.8, preferably a volume V6 that is encompassed in the pores with diameters that are greater than $D_{mean}$+15 Å, measured by mercury porosimetry, that is less than 0.2 ml/g, preferably less than 0.1 ml/g, and even more preferably less than 0.05 ml/g, a total pore volume, measured by mercury porosimetry, encompassed between 0.1 ml/g and 0.6 ml/g, preferably encompassed between 0.20 and 0.50 ml/g, and even more preferably more than 0.20 ml/g, a total pore volume, measured by nitrogen porosimetry, encompassed between 0.1 ml/g and 0.6 ml/g, preferably between 0.20 and 0.50 ml/g, a BET specific surface area encompassed between 100 and 550 m$^2$/g, preferably encompassed between 150 and 500 m$^2$/g, preferably an adsorption surface area such that the ratio between the adsorption surface area and the BET surface area is more than 0.5, preferably more than 0.65, and more preferably more than 0.8, a pore volume, measured by mercury porosimetry, encompassed in the pores with diameters of more than 140 Å, of less than 0.1 ml/g, preferably of less than 0.05 ml/g, and even more preferably of less than 0.03 ml/g, a pore volume, measured by mercury porosimetry, encompassed in the pores with diameters of more than 160 Å, of less than 0.1 ml/g, preferably of less than 0.05 ml/g, and even more preferably of less than 0.025 ml/g, a pore volume, measured by mercury porosimetry, encompassed in the pores with diameters of more than 200 Å, of less than 0.1 ml/g, preferably of less than 0.05 ml/g, and even more preferably of less than 0.025 ml/g, a pore volume, measured by mercury porosimetry, encompassed in the pores with diameters of more than 500 Å, of less than 0.01 ml/g, an X diffraction diagram that contains at least the main lines that are characteristic of at least one of the transition aluminas contained in the group that consists of the rho, chi, kappa, eta, gamma, theta and delta aluminas, and preferably it contains at least the main lines that are characteristic of at least one of the transition aluminas contained in the group that consists of the gamma, eta, theta and delta alumina, and more preferably, it contains at least the main lines that are characteristic of the gamma-alumina and eta-alumina, and even more preferably it contains the peaks at one d encompassed between 1.39 and 1.40 Å and the peaks at one d encompassed between 1.97 Å and 2.00 Å.

The packing density of the substrates, after calcination, is generally more than 0.65 g/cm$^3$, preferably more than 0.72 g/cm$^3$, very preferably more than 0.75 g/cm$^3$, and even more preferably more than 0.78 g/cm$^3$.

The packing density of the catalysts is generally more than 0.85 g/cm³, preferably more than 0.95 g/cm³, very preferably more than 1.025 cm³/g, and even more preferably more than 1.1 g/cm³.

The NMR MAS spectra of the solid of $^{27}$Al of the substrates and catalysts show two clusters of separate peaks. A first type of aluminum whose maximum resonates toward 10 ppm extends between –100 and 20 ppm. The position of the maximum suggests that these radicals are essentially of $Al_{VI}$ type (octahedral). A second type of minority aluminum whose maximum resonates toward 60 ppm extends between 20 and 110 ppm. This cluster can be decomposed into at least two radicals. The predominant radical of this cluster would correspond to $Al_{IV}$ atoms (tetrahedral). For the substrates and catalysts of this invention, advantageously the proportion of octahedral $Al_{VI}$ is more than 50%, preferably more than 60%, and even more preferably more than 70%.

In an embodiment of the invention, the catalyst contains a substrate that comprises at least two silico-aluminum zones, whereby said zones have Si/Al ratios that are less than or greater than the overall Si/Al ratio that is determined by X fluorescence. Thus, a substrate that has an Si/Al ratio that is equal to 0.5 comprises, for example, two silico-aluminum zones, one of the zones has an Si/Al ratio that is determined by MET of less than 0.5, and the other zone has an Si/Al ratio that is determined by MET of between 0.5 and 2.5.

In another embodiment of the invention, the catalyst contains a substrate that comprises a single silico-aluminum zone, whereby said zone has an Si/Al ratio that is equal to the overall Si/Al ratio that is determined by X fluorescence and is less than 2.3.

The acidity of the substrate according to the invention can advantageously be measured, without restricting the scope of the invention, by IR tracking of the thermodesorption of the pyridine. Generally, the B/L ratio, as described above, of the substrate according to the invention is between 0.05 and 1, preferably between 0.05 and 0.7, very preferably between 0.06 and 0.3, and even more preferably between 0.075 and 0.15.

The conversion of the feedstock is less than 50%, preferably less than 40% and generally less than 30%.

Stage (b) of Catalytic Dewaxing

The catalytic dewaxing of at least a portion of the effluent that is obtained from stage a) is carried out at a temperature of 200-500° C., under a pressure of 1-25 MPa, with an hourly volumetric flow rate of 0.05-50 h⁻¹, in the presence of 50-2000 liters of hydrogen/liter of effluent that enters stage b and in the presence of a catalyst that comprises at least one hydro-dehydrogenating element and at least one molecular sieve.

Stage (a) is optionally preceded by a hydrotreatment stage that is generally carried out at a temperature of 200-450° C., under a pressure of 2 to 25 MPa, with a volumetric flow rate of 0.1-6 h⁻¹, in the presence of hydrogen in the hydrogen/hydrocarbon volumetric ratio of 100-2000 l/l, and in the presence of an amorphous catalyst that comprises at least one metal of group VIII and at least one metal of group VI B.

The entire effluent that is obtained from stage (a) may be sent into stage (b).

Stage (a) optionally can be followed by a separation of light gaseous compounds from the effluent that is obtained at the end of stage (a).

The effluent that is obtained from the converting pretreatment stage (a) is preferably subjected to a distillation stage (preferably atmospheric) so as to separate the components that have a boiling point that is less than 340° C. (gas, gasoline, kerosene, gas oil) from products that have an initial boiling point that is more than at least 340° C. and that form the residue. Thus, generally at least one middle distillate fraction that has a pour point of at most –20° C. and a cetane number of at least 50 is separated.

The catalytic dewaxing stage (b) is then applied at least to the residue at the end of the distillation that contains compounds with a boiling point that is more than at least 340° C. In another embodiment of the invention, the effluent that is obtained from stage (a) is not distilled before using stage (b). At the very most, it undergoes a separation of at least a portion of light gases (by flash . . . ), and it is then subjected to catalytic dewaxing.

Stage (b) is preferably carried out with a zeolite-based catalyst that is selected from the group that is formed by TON-structural-type zeolites (theta-1, ISI-1, ZSM-22, KZ-2, and NU-10), the zeolites ZSM-48, ZBM-30, EU-2, EU-11, ferrierite, EU-1 and EU-13, whereby the catalyst contains at least one hydro-dehydrogenating element, preferably selected from among the elements of group VIB and of group VIII of the periodic table and at least one porous mineral matrix.

Advantageously, the effluent that is obtained from the dewaxing treatment is subjected to a distillation stage that advantageously comprises an atmospheric distillation and a vacuum distillation so as to separate at least one oil fraction with a boiling point that is more than at least 340° C. It most often has a pour point that is less than –10° C. and a VI that is more than 95, a viscosity at 100° C. of at least 3 cSt (or 3 mm²/s). This distillation stage is essential when there is no distillation between stages (a) and (b).

Advantageously, the effluent that is obtained from the dewaxing treatment, optionally distilled, is subjected to a hydrofinishing treatment.

DETAILED DESCRIPTION OF THE INVENTION

The Feedstock

The feedstocks that can be treated according to the process of the invention are advantageously fractions that have relatively high pour points whose value is desired to be decreased.

Typical feedstocks that can be treated advantageously according to the invention in general have a pour point above 0° C. The products that result from the treatment according to the process have pour points of less than 0° C. and preferably less than about –10° C.

The hydrocarbon feedstock from which the high quality oils and optionally the middle distillates are obtained preferably contains at least 20% by volume of compounds that boil above 340° C., preferably at at least 350° C., and advantageously at at least 380° C. This does not mean that the boiling point is 380° C. and more, but 380° C. or more.

The feedstock can contain n-paraffins, and in this case, it is not composed of them in the majority.

The feedstock can also be, for example, distillates that are obtained from the direct distillation of crude or conversion units such as the FCC, the coker or the visbreaking, or that are obtained from aromatic compound extraction units, or obtained from desulfurization or hydroconversion of RAT (atmospheric residues) and/or of RSV (vacuum residues), or else the feedstock can be a deasphalted oil, or else a hydrocracking residue that is obtained from, for example, a hydrocracking stage, whereby a vacuum distillate has undergone a hydrorefining stage, and more generally, bases for lubricating oils, or else polyalpha-olefins with a high pour point or any mixture of the above-cited feedstocks, whereby the paraffins that are obtained from the Fischer-Tropsch process are excluded.

In general, the feedstocks that are suitable for the target oils have an initial boiling point that is higher than at least 340° C., and better yet higher than at least 370° C.

The feedstock that is introduced into converting pretreatment stage (a) should be clean. Clean feedstock is defined as the feedstocks whose sulfur content is less than 1000 ppm by weight, preferably less than 500 ppm by weight, and even more preferably less than 300 ppm by weight or, better, 100 ppm by weight. The nitrogen content is less than 200 ppm by weight, preferably less than 100 ppm by weight, and even more preferably less than 50 ppm by weight. The metal content of the feedstock, such as nickel and vanadium, is extremely reduced, i.e., less than 50 ppm by weight, more advantageously less than 10 ppm by weight, or, better, less than 2 ppm by weight. The cumulative content of nickel and vanadium of the feedstocks that are treated in the process according to the invention is preferably less than 1 ppm by weight.

In the case where the contents of organic nitrogen-containing compounds, organic sulfides and resins are likely to produce excessive deactivation of the catalytic system, the feedstock (for example a vacuum distillate) will have to undergo, before entering the pretreatment stage zone of the process according to the invention, a hydrotreatment in a hydrotreatment zone. The hydrogen will be reacted with the feedstock that is in contact with a hydrotreatment catalyst whose role is to reduce the contents of nitrogen-containing and sulfur-containing organic molecules as well as resins that are present, for example, in a vacuum distillate. The hydrorefining of these molecules will produce the formation of ammonia ($NH_3$) and hydrogen sulfide ($H_2S$).

In the case where the feedstock that is to be treated is not clean in the meaning defined above, it is subjected in a first step to a prior hydrotreatment stage during which it is brought into contact, in the presence of hydrogen, with at least one catalyst that comprises an amorphous substrate and at least one metal that has a hydro-dehydrogenating function that is ensured by, for example, at least one element of group VIB and at least one element of group VIII, at a temperature of between 200 and 450° C., preferably 250-450° C., and advantageously 330-450° C. or 360-420° C., under a pressure encompassed in 5 and 25 MPa or, better, less than 20 MPa, preferably between 5 and 20 MPa, whereby the volumetric flow rate is encompassed between 0.1 and 6 $h^{-1}$, preferably, 0.3-3 $h^{-1}$, and the amount of hydrogen that is introduced is such that the hydrogen/hydrocarbon volumetric ratio is encompassed between 100 and 2000 liters/liter.

The substrate is generally based on (preferably essentially consists of) alumina or amorphous silica-alumina; it can also contain boron oxide, magnesia oxide, zirconia oxide, titanium oxide or a combination of these oxides. The hydro-dehydrogenating function is preferably performed by at least one metal or metal compound of groups VIII and VIB that is (are) preferably selected from among: molybdenum, tungsten, nickel and cobalt.

This catalyst can advantageously contain phosphorus; actually, it is known in the prior art that the compound provides two advantages to hydrotreatment catalysts: a facility of preparation during, in particular, the impregnation of nickel and molybdenum solutions and a better hydrogenation activity.

The preferred catalysts are the NiMo and/or NiW catalysts on alumina, also the NiMo and/or NiW catalysts on alumina that is doped with at least one element that is contained in the group of atoms formed by phosphorus, boron, silicon and fluorine, or else the NiMo and/or NiW catalysts on silica-alumina, or on silica-alumina-oxide of titanium that may or may not be doped by at least one element that is contained in the group of atoms formed by phosphorus, boron, fluorine and silicon.

The total concentration of metal oxides of groups VIB and VIII is encompassed between 5 and 40% by weight and preferably 7 and 30%, and the ratio by weight that is expressed in terms of metal oxide between group VI metal (or metals) vs. group VIII metal (or metals) is preferably between 1.25 and 20, and even more preferably between 2 and 10. The concentration of phosphorus oxide $P_2O_5$ will be less than 15% by weight and preferably 10% by weight.

Before being sent into stage (a), the product that is obtained at the end of the hydrotreatment undergoes, if necessary, an intermediate separation of $H_2S$ et $NH_3$, produced during the hydrorefining stage, so as to bring the content of water, $H_2S$ and $NH_3$ in the feedstock that is introduced in stage (a) to values that are respectively less than at most 100 ppm, 200 ppm, and 50 ppm. At this level, it is possible to provide an optional separation of products having a boiling point, for example, that is less than 340° C. so as to treat in stage (a) only one residue, i.e., the fraction with a boiling point that is, for example, higher than 340° C.

Stage (a): Converting Pretreatment Stage

The Catalyst

Stage (a) takes place in the presence of hydrogen and in the presence of a bifunctional catalyst that comprises a non-zeolitic acid substrate according to the invention, and a hydro-dehydrogenating metallic function that is ensured by at least one noble metal of group VIII. The catalyst has the characteristics listed above.

A preferred catalyst is prepared starting from a substrate that comprises a particular silica-alumina that has the following characteristics:

the content by mass of silica ($SiO_2$) is more than 5% by weight and less than or equal to 95% by weight of silica ($SiO_2$), preferably encompassed between 10 and 80% by weight, preferably a silica content that is more than 20% by weight and less than 80% by weight, and even more preferably more than 25% by weight and less than 75% by weight; the silica content is advantageously encompassed between 10 and 50% by weight.

preferably, the cationic impurity content is less than 0.1% by weight, preferably less than 0.05% by weight, and even more preferably less than 0.025% by weight. Cationic impurity content is defined as the total alkaline content.

preferably, the anionic impurity content is less than 1% by weight, preferably less than 0.5% by weight, and even more preferably less than 0.1% by weight.

the mean pore diameter, measured by mercury porosimetry, is encompassed between 20 and 140 Å, preferably between 40 and 120 Å, and even more preferably between 50 and 100 Å.

preferably, the ratio between volume V2, measured by mercury porosimetry, encompassed between $D_{mean}-30$ Å and $D_{mean}+30$ Å, to the total pore volume that is also measured by mercury porosimetry, is more than 0.6, preferably more than 0.7, and even more preferably more than 0.8.

preferably, volume V3 that is encompassed in the pores with diameters of more than $D_{mean}+30$ Å, measured by mercury porosimetry, is less than 0.1 ml/g, preferably less than 0.06 ml/g, and even more preferably less than 0.04 ml/g.

preferably, the ratio between volume V5, measured by mercury porosimetry, encompassed between $D_{mean}-15$ Å and $D_{mean}+15$ Å to volume V2, measured by mercury porosimetry, encompassed between $D_{mean}-30$ Å and $D_{mean}+30$ Å, is higher than 0.6, preferably higher than 0.7, and even more preferably higher than 0.8.

preferably, volume 6, encompassed in the pores with diameters of more than $D_{mean}+15$ Å and measured by mercury porosimetry, is less than 0.2 ml/g, preferably less than 0.1 ml/g, and even more preferably less than 0.05 ml/g.

the total pore volume, measured by mercury porosimetry, is encompassed between 0.1 ml/g and 0.6 ml/g, preferably encompassed between 0.20 and 0.50 ml/g, and even more preferably more than 0.20 ml/g.

the total pore volume, measured by nitrogen adsorption, is encompassed between 0.1 ml/g and 0.6 ml/g, preferably encompassed between 0.20 and 0.50 ml/g.

the BET specific surface area is encompassed between 100 and 550 m²/g, preferably encompassed between 150 and 500 m²/g.

preferably, the adsorption surface area is such that the ratio between the adsorption surface area and the BET surface area is more than 0.5, preferably more than 0.65, and even more preferably more than 0.8.

the pore volume, measured by mercury porosimetry, encompassed in the pores with diameters of more than 140 Å, is less than 0.1 ml/g, preferably less than 0.05 ml/g, and even more preferably less than 0.03 ml/g.

the pore volume, measured by mercury porosimetry, encompassed in the pores with diameters of more than 160 Å, is less than 0.1 ml/g, preferably less than 0.05 ml/g, and even more preferably less than 0.025 ml/g.

the pore volume, measured by mercury porosimetry, encompassed in the pores with diameters of more than 200 Å, is less than 0.1 ml/g, preferably less than 0.05 ml/g, and even more preferably less than 0.025 ml/g.

the pore volume, measured by mercury porosimetry, encompassed in the pores with diameters of more than 500 Å, is less than 0.01 ml/g.

the X diffraction diagram contains at least the main lines that are characteristic of at least one of the transition aluminas contained in the group that consists of the alpha, rho, chi, eta, gamma, kappa, theta and delta aluminas, preferably it contains at least the main lines that are characteristic of at least one of the transition aluminas contained in the group that consists of gamma, eta, theta and delta alumina, more preferably it contains at least the main lines that are characteristic of the gamma-alumina and eta-alumina, and even more preferably, it contains peaks at one d encompassed between 1.39 and 1.40 Å and peaks at one decompassed between 1.97 Å and 2.00 Å.

The packing density of substrates, after calcination, is generally more than 0.65 g/cm³, preferably more than 0.72 g/cm³, very preferably more than 0.75 g/cm³, and even more preferably more than 0.78 g/cm³.

The packing density of the catalysts is generally more than 0.85 g/cm³, preferably more than 0.95 g/cm³, very preferably more than 1.025 cm³/g, and even more preferably more than 1.1 g/cm³.

The NMR MAS spectra of the solid of $^{27}$Al of the substrates show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 110 ppm. This cluster can be decomposed into at least two radicals. The predominant radical of this cluster would correspond to $Al_{IV}$ atoms (tetrahedral). For the substrates and catalysts of this invention, advantageously the proportion of octahedral $Al_{VI}$ is more than 50%, preferably more than 60%, and even more preferably more than 70%.

In an embodiment of the invention, the substrate comprises at least two silico-aluminum zones having Si/Al ratios that are less than or greater than the overall Si/Al ratio that is determined by X fluorescence. A substrate according to this invention that has an overall Si/Al ratio that is equal to 0.5 comprises, for example, two silico-aluminum zones, one of the zones has an Si/Al ratio that is determined by MET of less than 0.5, and the other zone has an Si/Al ratio that is determined by MET of between 0.5 and 2.5.

In another embodiment of the invention, the substrate comprises a single silico-aluminum zone that has an Si/Al ratio that is equal to the overall Si/Al ratio that is determined by X fluorescence and is less than 2.3.

The acidity of the substrate according to the invention can advantageously be measured, without restricting the scope of the invention, by IR tracking of the thermodesorption of the pyridine. Generally, the B/L ratio, as described above, of the substrate according to the invention is between 0.05 and 1, preferably between 0.05 and 0.7, very preferably between 0.06 and 0.3, and even preferably between 0.075 and 0.15.

Preparation of the Substrate

The applicant discovered that the silico-aluminum substrates obtained starting from a mixture at any arbitrary stage of an alumina compound that is partially soluble in acid medium shaped with a totally soluble silica compound or with a totally soluble combination of hydrated alumina and silica, followed by a hydrothermal or thermal treatment so as to homogenize on the micrometer scale, and even on the nanometer scale, would make it possible to obtain a particularly active catalyst in the hydrocracking processes. Partially soluble in acid medium is defined as bringing the alumina compound into contact before any addition of totally soluble silica compound or the combination with an acid solution, for example, nitric acid or sulfuric acid, causes partial dissolution thereof.

Silica Sources

The silica compounds that are used according to the invention may have been selected from the group that is formed by silicic acid, silicic acid soils, water-soluble alkaline silicates, cationic silicon salts, for example the hydrated sodium metasilicate, Ludox® in ammonia form or in alkaline form, and quaternary ammonium silicates. The silica soil can be prepared according to one of the methods known to one skilled in the art. A decationized orthosilicic acid solution is preferably prepared starting from a water-soluble alkaline silicate by ion exchange on a resin.

Totally Soluble Silica-Alumina Sources

The totally soluble hydrated silica-aluminas that are used according to the invention can be prepared by true coprecipitation under controlled stationary operating conditions (pH, concentration, temperature, average dwell time) by reaction of a basic solution that contains silicon, for example in the form of sodium silicate, optionally aluminum, for example, in sodium aluminate form with an acid solution that contains at least one aluminum salt, for example aluminum sulfate. At least one carbonate or else $CO_2$ optionally can be added to the reaction medium.

The applicant defines true coprecipitation as a process by which at least one aluminum compound that is totally soluble in basic medium or acid medium as described below, and at least one silicon compound as described below are brought into contact, simultaneously or sequentially, in the presence of at least one precipitating and/or coprecipitating compound so as to obtain a mixed phase that essentially consists of hydrated silica-aluminas that is optionally homogenized by intense stirring, shearing, colloidal grinding or else by a combination of these unitary operations. For example, these hydrated silica-aluminas may have been prepared according to the teachings of U.S. Pat. Nos. 2,908,635; 3,423,332, 3,433,747, 3,451,947, 3,629,152, and 3,650,988.

The total dissolution of the silica compound or the combination was evaluated approximately according to the following method. A fixed amount (15 g) of the silica compound or the hydrated combination is introduced into a preset pH medium. The concentration of solid added per liter of suspension is preferably 0.2 mol per liter. The pH of the dispersion solution is at least 12, and it is obtained by use of an alkaline source. It is preferably advantageous to use NaOH. The mixture is then stirred mechanically by a deflocculant-type turbine stirring mechanism for 30 minutes at 800 rpm. Once the stirring is ended, the mixture is centrifuged for 10 minutes at 3000 rpm. The cake is separated from the supernatant liquid. The solution was filtered on a filter with a porosity of 4 and a diameter of 19 cm. The drying and then the calcination are then initiated at 1000° C. of the two fractions. Then, an equal ratio R is defined by dividing the decanted mass by the mass of the solid in suspension. Totally soluble is defined as a ratio R that is at least higher than 0.9.

Alumina Sources

The alumina compounds that are used according to the invention are partially soluble in acid medium. They are selected completely or partially from the group of alumina compounds of general formula $Al_2O_3$, $nH_2O$. It is possible in particular to use hydrated alumina compounds such as: hydrargillite, gibbsite, bayerite, boehmite, pseudo-boehmite, and amorphous or essentially amorphous alumina gels. It is also possible to use the dehydrated forms of these compounds that consist of transition aluminas and that comprise at least one of the phases that is included in the group: rho, chi, eta, gamma, kappa, theta, and delta, which differ essentially by the organization of their crystalline structure. The alpha-alumina that is commonly called corundum can be incorporated in a small proportion in the substrate according to the invention.

This partial dissolution property is a desired property of the invention; it applies to hydrated alumina powders, to sprayed hydrated alumina powders, to dispersions or suspensions of hydrated alumina or to any combination thereof, before any addition of a compound that contains some or all of the silicon.

The partial dissolution of the alumina compound was evaluated approximately according to the following method. A specific amount of the alumina compound in powdered or suspension form is introduced into a preset pH medium. The mixture is then stirred mechanically. Once the stirring is ended, the mixture is left without stirring for 24 hours. Preferably, the $Al_2O_3$ solid concentration that is added per liter of suspension is 0.5 mol per liter. The pH of the dispersion solution is 2 and is obtained by use of $HNO_3$, HCl, or $HClO_4$. Preferably, it is advantageous to use $HNO_3$. The distribution of sedimented and dissolved fractions was followed by metering of aluminum by UV absorption. The supernatants were ultrafiltered (polyether sulfone membrane, Millipore NMWL: 30,000) and digested in concentrated acid. The amount of aluminum in the supernatant corresponds to the non-sedimented alumina compound and the dissolved aluminum and the fraction that is ultrafiltered with dissolved aluminum only. The amount of sedimented particles is derived from the theoretical concentration of aluminum in the dispersion (by considering that all of the solid that is introduced is dispersed) and amounts of boehmite actually dispersed and aluminum in solution.

The alumina precursors that are used according to this invention are therefore distinguished from those that are used in the case of true co-precipitations that are entirely soluble in acid medium: cationic alumina salts, for example aluminum nitrate. The methods that are part of the invention are distinguished from true co-precipitations because one of the elements, in this case the aluminum compound, is partially soluble.

To use the alumina, any alumina compound of general formula $Al_2O_3$, $nH_2O$ can be used. Its specific surface area is between 150 and 600 $m^2/g$. It is possible in particular to use hydrated alumina compounds, such as: hydrargillite, gibbsite, bayerite, boehmite, pseudo-boehmite and amorphous or essentially amorphous alumina gels. It is also possible to use the dehydrated forms of these compounds that consist of transition aluminas and that comprise at least one of the phases that is included in the group: rho, chi, eta, gamma, kappa, theta, delta and alpha, which differ essentially by the organization of their crystalline structure. During heat treatments, these different forms are liable to evolve among themselves, according to a complex relationship that depends on the treatment operating conditions. It is also possible to use the alpha-alumina that is commonly called corundum in measured proportions.

Aluminum hydrate $Al_2O_3$, $nH_2O$ that is used is more preferably boehmite, pseudo-boehmite and the amorphous or essentially amorphous alumina gels. A mixture of these products under any arbitrary combination can also be used.

Boehmite is generally described as an aluminum monhydrate of formula $Al_2O_3$, $nH_2O$ that in reality includes a broad continuum of materials with variable degrees of hydration and organization with more or less well-defined boundaries: the most hydrated gelatinous boehmite, with n able to be more than 2, the pseudo-boehmite or the microcrystalline boehmite with n encompassed between 1 and 2, then crystalline boehmite, and finally boehmite that is well crystallized with large crystals with n close to 1. The morphology of aluminum monohydrate can vary within broad limits between these two acicular or prismatic end forms. An entire set of variable forms can be used between these two forms: chain, boats, interlaced platelets.

The preparation and/or the shaping of the aluminum hydrate thus can constitute the first stage of the preparation of these catalysts. Many patents relate to the preparation and/or the shaping of transition-alumina-based substrates that are obtained from aluminum monohydrate: U.S. Pat. Nos. 3,520,654; 3,630,670; 3,864,461; 4,154,812; 4,313,923; DE 3243193; and U.S. Pat. No. 4,371,513.

Relatively pure aluminum hydrates can be used in the form of amorphous or crystallized powder or crystallized powder containing an amorphous portion. The aluminum hydrate can also be introduced in the form of aqueous suspensions or dispersions. The aqueous suspensions or dispersions of aluminum hydrate that are used according to the invention may have the ability to gel or solidify. The aqueous dispersions or suspensions can also be obtained, as is well known to one skilled in the art, by peptization in water or water that is acidified with aluminum hydrates. The dispersion of aluminum hydrate can be carried out by any process that is known to one skilled in the art: in a batch reactor, a continuous mixer, a mixing machine, or a colloidal mill. Such mixing can be also be carried out in a piston flow reactor and, in particular, in a static mixer. The Lightnin reactors can be cited.

In addition, it is also possible to use as an alumina source an alumina that has been subjected in advance to a treatment that can improve its degree of dispersion. By way of example, it will be possible to improve the dispersion of the alumina source by a preliminary homogenization treatment. For homogenization, it is possible to use at least one of the homogenization treatments described in the following text.

The aqueous dispersions or suspensions of alumina that can be used are, in particular, the aqueous suspensions or dispersions of fine or ultra-fine boehmites that consist of particles that have dimensions in the colloidal range.

Fine or ultra-fine boehmites that are used according to this invention may have been obtained in particular according to French Patents FR-1 261 182 and FR-1 381 282 or according to European Patent Application EP 15 196.

It is also possible to use the aqueous suspensions or dispersions that are obtained from pseudo-boehmite, amorphous alumina gels, aluminum hydroxide gels or ultra-fine hydrargillite gels.

Aluminum monohydrate can be purchased from among a variety of commercial sources of alumina, such as, in particular, PURAL®, CATAPAL®, DISPERAL®, and DISPAL® that are marketed by the SASOL Company or else HIQ® that is marketed by ALCOA, or according to the methods that are known to one skilled in the art: it can be prepared by partial dehydration of aluminum trihydrate by conventional methods or it can be prepared by precipitation. When these alumina are presented in the form of a gel, they are peptized by water or an acidified solution. In the precipitation, the acid source can be selected, for example, from among at least one of the following compounds: aluminum chloride, aluminum sulfate, or aluminum nitrate. The basic aluminum source can be selected from among the basic aluminum salts such as sodium aluminate and potassium aluminate.

As precipitating agents, sodium hydroxide, sodium carbonate, potassium and ammonia can be used. The precipitating agents are selected such that the alumina source according to this invention and these agents are precipitated together.

According to the acidic or basic nature of the aluminum-based starting compound, the aluminum hydrate is precipitated with the help of a base or an acid that is selected, for example, from among hydrochloric acid, sulfuric acid, soda or a basic or acidic compound of the aluminum as cited above. The two reagents can be aluminum sulfate and sodium aluminate. For an example of preparation of aluminum alpha-monohydrate that uses aluminum sulfate and soda aluminate, it is possible to refer in particular to U.S. Pat. No. 4,154,812.

In particular, pseudo-boehmite may have been prepared according to the process that is described in U.S. Pat. No. 3,630,670 by reaction of an alkaline aluminate solution with a mineral acid solution. The pseudo-boehmite may have been prepared in particular according to the process that is described in U.S. Pat. No. 3,630,670 by reaction of an alkaline aluminate solution with a solution of a mineral acid. It may also have been prepared as described in French Patent FR 1 357 830.

In particular, the amorphous alumina gels may have been prepared according to the processes that are described in the article "Alcoa Paper No. 19 (1972) pages 9 to 12" and in particular by reaction of acid aluminate or an aluminum salt or by hydrolysis of aluminum alcoholates or by hydrolysis of basic aluminum salts.

The aluminum hydroxide gels can be in particular those that have been prepared according to the processes that are described in U.S. Pat. No. 3,268,295 and U.S. Pat. No. 3,245,919.

In particular, the aluminum hydroxide gels may be those prepared according to the processes that are described in Patent WO 00/01617, by mixing an aluminum acid source and a base or an aluminum basic source and an acid so as to precipitate an alumina monohydrate, whereby the following stages are:

2. development
3. filtration
4. washing, and
5. drying, processes characterized in that the mixing of stage one is carried out without retromixing.

The ultrafine hydrargillite may have been prepared according to the process that is described in U.S. Pat. No. 1,371,808 by evolving toward a temperature encompassed between ambient temperature and 60° C. for alumina gels in cake form and that contain 0.1 monovalent acid ions relative to the alumina, counted in $Al_2O_3$ molecules.

It is also possible to use ultra-pure aqueous suspensions or dispersions of boehmite or pseudo-boehmite that are prepared according to a process in which the reaction of an alkaline aluminate with the carbonic anhydride is carried out to form an amorphous aluminum hydroxycarbonate precipitate, the precipitate that is obtained by filtration is separated, and then the latter is washed (the process is described in particular in U.S. Pat. No. 3,268,295).

Then,
a) in a first stage, the precipitate that is washed with amorphous aluminum hydroxycarbonate is mixed with an acid solution, a base or a salt or mixtures thereof; this mixing is carried out by pouring the solution over the hydroxycarbonate, whereby the pH of the thus constituted medium is less than 11,
b) in a second stage, the thus constituted reaction medium is heated to a temperature of less than 90° C. for a period of at least 5 minutes,
c) in a third stage, the medium that results from the second stage is heated to a temperature of between 90° C. et 250° C.

The boehmite and pseudo-boehmite dispersions or suspensions that are obtained according to this process exhibit an alkaline content of less than 0.005% that is expressed in the form of a ratio by weight of alkaline metal oxide/$Al_2O_3$.

When it is desired to produce very pure catalyst substrates, ultra-pure boehmite or pseudo-boehmite suspensions or dispersions are preferably used that have been obtained according to the process that was described above, or the aluminum hydroxide gels that were prepared starting from the hydrolysis of aluminum alcoholates according to a process of the type that is described in U.S. Pat. No. 2,892,858.

In summary, the production process that leads to such boehmite-type aluminum hydroxide gels obtained as a by-product in the production of alcohol by hydrolysis of an alcoholate or alkoxide of aluminum (Ziegler synthesis) is described. The Ziegler alcohol synthesis reactions are described in particular in U.S. Pat. No. 2,892,858. According to this process, first triethyl aluminum is prepared starting from aluminum, hydrogen and ethylene, whereby the reaction is carried out in two stages with partial recycling of triethyl aluminum.

Ethylene is added into the polymerization stage, and the product that is obtained is then oxidized into aluminum alcoholate, whereby the alcohols are obtained by hydrolysis.

The aluminum hydroxide gels can also be those that were prepared according to the processes described in U.S. Pat. No. 4,676,928-A and U.S. Pat. No. 6,030,599.

The hydrated alumina that is obtained as a by product of the Ziegler reaction is described in particular in a report of the CONOCO Company dated Jan. 19, 1971.

The dimension of the alumina particles that constitute the alumina source can vary within wide limits. It is generally between 1 and 100 microns.

Methods

The substrate can be advantageously prepared by one of the methods described below.

By way of example, a method of preparation of a silica-alumina that is part of the invention consists in preparing, starting from a water-soluble alkaline silicate, an orthosilicic acid solution ($H_2SiO_4$, $H_2O$) that is decationized by ion exchange, then in simultaneously adding it to a cationic aluminum salt in solution, for example, nitrate, and to ammonia under controlled operating conditions; or else adding the orthosilicic acid solution to the cationic aluminum salt in solution and coprecipitating the solution that is obtained by ammonia under controlled operating conditions leading to a homogeneous product. This silica-alumina hydrogel is mixed with an aluminum hydrate powder or suspension. After filtering and washing, drying with shaping then calcination, preferably in air, in a rotary kiln, at a high temperature and for an adequate period to promote interactions between the alumina and the silica, generally at least two hours, a substrate that fulfills the characteristics of the invention is obtained.

Another method for preparation of silica-alumina according to the invention consists in precipitating the alumina hydrate as above, in washing it, then in mixing it with aqueous orthosilicic acid so as to obtain a suspension, which is thoroughly homogenized by vigorous stirring and shearing. An Ultraturrax turbine or else a Staro turbine can be used, or else a colloidal mill, for example a Staro colloidal mill. The homogeneous suspension is then dried by spraying as above, then calcined between 500 and 1200° C. for at least three hours: a silica-alumina substrate that can be used in the process according to the invention is obtained.

Another method that is part of the invention consists in preparing as above a decationized solution of orthosilicic acid then in adding it simultaneously or consecutively to an alumina compound, for example an aluminum hydrate in powdered form or in an acidified suspension form. To increase the diameter of the pores of the final silica-alumina substrate, at least one basic compound can optionally be added to the reaction medium. After an intense homogenization of the suspension by stirring, optional adjustment by filtration of the content of dry material then optionally rehomogenization, the product is dried with simultaneous or consecutive shaping, then calcined as above.

Another method that is also part of the invention consists in preparing an aqueous alumina suspension or dispersion, for example an aluminum monohydrate, then in adding it simultaneously or consecutively to a silica compound, for example a sodium silicate. To increase the final diameter of the pores of the silica-alumina substrate, at least one basic compound can optionally be added to the reaction medium. The substrate is obtained by filtration and washing, optionally washing by an ammonia solution to extract the residual sodium by ion exchange, drying with simultaneous or consecutive shaping. After drying with shaping, then calcination as above, a substrate that fulfills the characteristics of the invention is obtained. The size of the alumina particles used is preferably between 1 and 100 microns to obtain a good homogenization of the silica-alumina substrate according to the invention.

To increase the diameter of the mesopores of the silica-alumina substrate, it may be particularly advantageous, as U.S. Pat. No. 4,066,574 teaches us, to prepare an aqueous alumina suspension or dispersion, for example, an aluminum monohydrate, and then to neutralize by a basic solution, for example ammonia, then to add it simultaneously or consecutively to a silica compound, for example a decationized orthosilicic acid solution. After an intensive homogenization of the suspension by intense stirring, optional adjustment by filtration of the dry material content then rehomogenization, the product is dried with simultaneous or consecutive shaping, then calcined as above. This method is also part of the methods that are used according to the invention.

In the presentation of the above-mentioned methods, homogenization is used to describe putting back into solution a product that contains a solid fraction, for example a suspension, a powder, a filtered precipitate, then its dispersion under intense stirring. The homogenization of a dispersion is a process that is well known to one skilled in the art. Said homogenization can be carried out by any process that is known to one skilled in the art: by way of example, in a batch reactor, a continuous mixer, or a mixing machine. Such a mixing can be carried out in a piston flow reactor and in particular in a static reactor. The Lightnin reactors can be cited. An Ultraturrax® turbine or else a Staro® turbine can be used, or else a colloidal mill, for example a Staro colloidal mill. The commercial colloidal mills IKA® can also be used.

In all of the above-mentioned methods, it may optionally be desirable to add, during any arbitrary stage of the preparation, a minor proportion of at least one stabilizing element that is selected from the group that is formed by zirconia and titanium. The stabilizing element is preferably added in the form of a soluble salt.

The substrate can be obtained by shaping the silica-alumina by any technique that is known to one skilled in the art. The shaping can be carried out, for example, by extrusion, by pelletizing, by the drop (oil-drop) coagulation method, by turntable granulation or by any other method that is well known to one skilled in the art.

The shaping can also be carried out in the presence of various components of the catalyst and extrusion of the mineral paste that is obtained, by pelletizing, shaping in the form of balls with a rotating groove or with a drum, drop coagulation, oil-drop, oil-up or any other known process for agglomeration of a powder that contains alumina and optionally other ingredients that are selected from among those that are mentioned above.

The catalysts that are used according to the invention have the shape of spheres or extrudates. It is advantageous, however, that the catalyst comes in the form of extrudates with diameters of between 0.5 and 5 mm and more particularly between 0.7 and 2.5 mm. The shapes are cylindrical (which may or may not be hollow), twisted cylindrical, multilobar (2, 3, 4 or 5 lobes, for example), and rings. The cylindrical shape is preferably used, but any other shape may be used.

Furthermore, these substrates that are used according to this invention may have been treated, as is well known to one skilled in the art, by additives to facilitate the shaping and/or to improve the final mechanical properties of the silico-aluminum substrates. By way of example of additives, it is possible to cite in particular cellulose, carboxymethyl-cellulose, carboxy-ethyl-cellulose, tall oil, xanthan gums, surfactants, flocculant agents such as polyacrylamides, carbon black, starches, stearic acid, polyacrylic alcohol, polyvinyl alcohol, biopolymers, glucose, polyethylene glycols, etc.

The adjustment of the porosity that is characteristic of the substrates of the invention is carried out partially during this shaping stage of the substrate particles.

The shaping can be carried out by using techniques for shaping the catalysts, known to one skilled in the art, such as, for example: extrusion, sugar-coating, spray-drying or else pelletizing.

It is possible to add or to withdraw water to adjust the viscosity of the paste that is to be extruded. This stage can be carried out at any stage of the mixing stage.

To adjust the content of solid material of the paste that is to be extruded so as to make it extrudable, it is also possible to add a compound that is solid for the most part and preferably an oxide or a hydrate. A hydrate will preferably be used, and even more preferably, an aluminum hydrate will be used. The fire loss of this hydrate will be more than 15%.

The acid content added in the mixing before the shaping is less than 30%, preferably between 0.5 and 20% by weight of the anhydrous silica and alumina mass that is engaged in the synthesis.

The extrusion can be carried out by any conventional tool, available commercially. The paste that is obtained from mixing is extruded through a dye, for example with the help of a piston or a single- or double-extrusion screw. This extrusion stage can be carried out by any method that is known to one skilled in the art.

The substrate extrudates of the invention generally have a resistance to the crushing of at least 70 N/cm and preferably greater than or equal to 100 N/cm.

Calcination of the Substrate

To obtain the substrate of this invention, it is preferable to calcinate preferably in the presence of molecular oxygen, for example by carrying out a flushing with air, at a temperature that is less than or equal to 1100° C. At least one calcination can be carried out after any arbitrary stage of the preparation. This treatment can be performed, for example, in a flushed bed, in a swept bed or in static atmosphere. For example, the furnace that is used can be a rotary kiln or a vertical furnace with radial flushed layers. The calcination conditions: the temperature and duration depend mainly on the maximum temperature of use of the catalyst. The preferred conditions of calcination are between more than one hour at 400° C. to less than one hour at 1100° C. The calcination can be performed in the presence of water vapor.

Post-Synthesis Treatments

Post-synthesis treatments can be carried out so as to improve the properties of the substrate, in particular its homogeneity as defined above.

According to the invention, the substrate thus can optionally be subjected to a hydrothermal treatment in a confined atmosphere. Hydrothermal treatment in a confined atmosphere is defined as a treatment by passage with an autoclave in the presence of water under a temperature that is higher than the ambient temperature.

During this hydrothermal treatment, it is possible to treat the shaped silica-alumina in different ways. Thus, it is possible to impregnate the silica-alumina with acid, prior to its passage to the autoclave, whereby autoclaving of the silica-alumina is done either in vapor phase or in liquid phase, whereby this vapor phase or liquid phase of the autoclave may or may not be acid. This impregnation, prior to the autoclaving, may or may not be acid. This impregnation, prior to the autoclaving, can be carried out in the dry state or by immersion of the silica-alumina in an acidic aqueous solution. Dry impregnation is defined as bringing into contact the alumina with a solution volume that is less than or equal to the total pore volume of the treated alumina. The impregnation is preferably carried out in the dry state.

The autoclave is preferably a rotary-basket autoclave such as the one that is defined in Patent Application EP-A-0 387 109.

The temperature during the autoclaving can be between 100 and 250° C. for a period of time of between 30 minutes and 3 hours.

The noble metals of group VII of the catalyst of this invention can be completely or partially present in metallic form and/or oxide form.

The sources of noble elements of group VIII that can be used are well known to one skilled in the art. In particular the halides, for example the chlorides, the nitrates, the acids such as chloroplatinic acid, and the oxychlorides such as ammoniacal ruthenium oxychloride, will be used.

The noble metal salt is introduced by one of the usual methods that are used to deposit the metal (preferably platinum and/or palladium, whereby the platinum is still preferred) on the surface of a substrate. One of the preferred methods is dry impregnation that consists in the introduction of the metal salt into a solution volume that is equal to the pore volume of the catalyst mass that is to be impregnated. Before the reduction operation, the catalyst will be able to undergo calcination, such as, for example, a dry-air treatment at 300-750° C. (preferably at 520° C.) for 0.25-10 hours (preferably for 2 hours).

A preferred pretreatment catalyst is based on platinum and/or palladium.

The catalyst generally does not contain added halogen other than the one that could be introduced for impregnation, noble metal for example.

The following elements: boron and/or silicon and/or phosphorus can be introduced into the catalyst at any level of the preparation and according to any technique that is known to one skilled in the art.

A preferred method according to the invention consists in depositing the selected dopant or dopants, for example the boron-silicon pair, on the precursor that may or may not be calcined, preferably calcined. For this purpose, an aqueous solution is prepared with at least one boron salt such as ammonium biborate or ammonium pentaborate in an alkaline medium and in the presence of oxidized water, and a so-called dry impregnation is initiated, in which the volume of the pores of the precursor is filled by a solution that contains, for example, boron. In the case where, for example, silicon is also deposited, a solution of a silicone-type silicon compound or a silicone oil emulsion will be used.

The deposition of boron and silicon can also be carried out simultaneously by using, for example, a solution that contains a boron salt and a silicone-type silicon compound.

The dopant that is selected from the group that is formed by silicon, boron and phosphorus can be introduced by one or more impregnation operations with excess solution on the calcined precursor.

When optionally at least one dopant, B and/or P and/or Si, is introduced, its distribution and its location can be determined by techniques such as the Castaing microprobe (distribution profile of various elements), transmission electron microscopy, combined with an X analysis of the components of the catalysts, or else by combining distribution mapping of elements that are present in the catalyst by electronic microprobe. These techniques make it possible to demonstrate the presence of these exogenic elements that are added after the synthesis of the silica-alumina according to the invention.

The Process

During stage (a), the molecules of the feedstock that is to be treated undergo hydroisomerization and hydrocracking reactions to result in the formation of products such as gas oils, kerosene and a residue whose properties (viscosity index) have been improved. The conversion is generally greater than 5%, preferably between 5 and 90%, but is generally at least 20% or greater than 20%.

Stage (a) has the effect of increasing the viscosity index (VI) of the hydrocracking residue, i.e., a fraction that has an initial boiling point of at least 340° C., and even at least 370° C. More generally, it is noted that the increase of VI is at least 2 points, whereby the VI is measured on the feedstock (residue) of stage (a) that is solvent-dewaxed and on the residue that is obtained from stage (a) that is also solvent-dewaxed, by targeting a pour point temperature of between −15 and −20° C.

An increase of VI of at least 5 points, and very often more than 5 points, and even more than 10 points, is generally obtained.

It is possible to control the increase of VI in particular starting from the measurement of the conversion. It will thus be possible to optimize the production toward oils at the top VI or toward higher oil outputs but with lower VI.

Before use in the pretreatment stage reaction, the metal that is contained in the catalyst should be reduced. One of the preferred methods for conducting the reduction of the metal is the treatment under hydrogen at a temperature of between 150° C. and 650° C. and a total pressure of between 0.1 and 25 MPa. For example, a reduction consists of a plateau at 150° C. for 2 hours, then a rise in temperature up to 450° C. at the rate of 1° C./minute, then a plateau of 2 hours at 450° C.; during this entire reduction stage, the hydrogen flow rate is 1000 liters of hydrogen/liter of catalyst. It is also noted that any ex-situ reduction method is suitable.

The operating conditions in which stage (a) is carried out are important.

The pressure is kept between 2 and 25 MPa, and preferably 2 to 20 MPa, and advantageously 2 to 18 MPa; the volumetric flow rate is between 0.1 $h^{-1}$ and 10 $h^{-1}$, preferably between 0.2 and 10 $h^{-1}$ and advantageously between 0.5 and 5.0 $h^{-1}$. The hydrogen level is between 100 and 2000 liters of hydrogen per liter of feedstock and preferably between 150 and 1500 liters of hydrogen per liter of feedstock.

The temperature that is used in this stage is between 200 and 450° C., preferably between 250° C. and 450° C., advantageously between 300 and 450° C. Even more advantageously, the temperature is higher than 340° C., for example between 340 and 450° C.

The two stages, hydrotreatment and pretreatment-conversion, can be carried out on the two types of catalysts in at least two different reactors and/or on at least two catalytic beds that are installed in the same reactor.

Treatment of the Effluent that is Obtained from Stage (a)

In a preferred embodiment, the effluent that is obtained from stage (a), converting pretreatment stage, can be completely treated in dewaxing stage (b). In a variant, it will be able to undergo a separation of at least a portion (and preferably at least a major portion) of light gases that comprise hydrogen and optionally also hydrocarbon-containing compounds with at most 4 carbon atoms. The hydrogen can be separated in advance. The embodiment (outside of the variant), with passage into stage (b) of the entire effluent of stage (a), is economically advantageous, since a single distillation unit is used at the end of the process. In addition, in the final distillation (after catalytic dewaxing or subsequent treatments), a low-temperature diesel fuel is obtained.

Advantageously in another embodiment, the effluent that is obtained from stage (a) is distilled so as to separate the light gases and also to separate at least one residue that contains compounds with a boiling point that is higher than at least 340° C. It is preferably an atmospheric distillation.

It is advantageously possible to distill to obtain several fractions (gasoline, kerosene, gas oil, for example) with a boiling point of at most 340° C. and a fraction (called a residue) with an initial boiling point that is higher than at least 340° C., preferably higher than 350° C., and even more preferably at least 370° C. or 380° C.

According to a preferred variant of the invention, this fraction (residue) will then be treated in the catalytic dewaxing stage, i.e., without undergoing vacuum distillation. In another variant, however, it is possible to use a vacuum distillation.

In an embodiment that is more aimed at producing middle distillates, and always according to the invention, it is possible to recycle a portion of the residue that is obtained from the separation stage to the reactor that contains the catalyst in the pretreatment stage so as to convert it and increase the production of middle distillates.

In a general way, in this text, the middle distillates are defined as the fraction(s) with an initial boiling point of at least 150° C. and a final boiling point that goes just up to the residue, i.e., generally up to 340° C. or 350° C. or preferably less than 370° C. or 380° C.

The effluent that is obtained from stage (a) can undergo, before or after distillation, other treatments such as, for example, an extraction of at least a portion of the aromatic compounds.

Stage (b): Catalytic Hydrodewaxing

At least a portion of the effluent that is obtained from stage (a), an effluent that has optionally undergone the separations and/or treatments described above, is then subjected to a catalytic dewaxing stage in the presence of hydrogen and a hydrodewaxing catalyst comprising an acid function, a hydro-dehydrogenating metallic function and at least one matrix.

It is noted that the compounds that boil above at least 340° C. are always subjected to catalytic dewaxing.

The Catalyst

The catalyst that is used in stage (b) is based on zeolite that is selected from the group that is formed by the TON-structural-type zeolites (theta-1, ISI-1, ZSM-22, KZ-2, and NU-10), the zeolites ZSM-48, ZBM-30, EU-2, EU-11, ferrierite, EU-1 and EU-13; the catalyst comprises at least one hydro-dehydrogenating element, preferably selected from among the elements of group VIB and group VIII of the periodic table and at least one porous mineral matrix.

TON-structural-type zeolites that are part of the composition of the catalyst are defined as the zeolites: theta-1, ISI-1, NU-10, KZ-2 and ZSM-22 described in the work "Atlas of Zeolite Structure Types," W. M. Meier, D. H. Olson and Ch. Baerlocher, 4th Revised Edition, 1996, Elsevier as well as in the U.S. Pat. No. 4,810,357 regarding the zeolite ZSM-22 and in Patents EP-65400 and EP-77624 for zeolite NU-10.

Zeolite EU-2 is described in the article Journal of Chemical Research, 192, (1985) and Patent GB 2077709A (corresponding to U.S. Pat. Nos. 4,741,891; 4,836,996; 4,876,412; 5,098,685); zeolite ZSM-48 is described in the article Zeolites, 5, 355, (1985), and Patents EP-A-23089, U.S. Pat. No. 4,397,827, EP-A-15132, EP-A-142317 and U.S. Pat. No. 5,961,591; zeolite EU-11 is described in the article Journal of Catalysis, 85, 135, (1985); and finally zeolite ZBM-30 is described in Patent EP-A-46504.

Zeolites NU-10, ZSM-22, ferrierite and ZBM-30 are preferably used. Even more preferably, zeolite ZBM-30 that is synthesized according to the methods that are described in Patent EP-A-46504 will be used, preferably according to the operating procedure that uses the triethylenetetramine structuring agent or the ferrierite zeolite.

The overall Si/Al ratio of the zeolites that are part of the composition of the catalysts according to the invention as well as the chemical composition of the samples are determined by X fluorescence and atomic absorption.

The Si/Al ratios of the zeolites that are described above are those that are obtained in the synthesis according to the operating procedures that are described in the various documents that are cited or duly obtained after the post-synthesis dealuminification treatments that are well-known to one skilled in the art, such as, by way of non-exhaustive examples, the hydrothermic treatments that may or may not be followed by acid attacks or else direct acid attacks by mineral or organic acid solutions.

The zeolites that are part of the composition of the hydrodewaxing catalysts according to the invention can be calcined and exchanged by at least one treatment by a solution of at least one ammonium salt so as to obtain the ammonium form of zeolites that once calcined leads to the hydrogen form of said zeolites.

The zeolites that are part of the composition of the hydrodewaxing catalyst according to the invention are at least in part, preferably almost totally, in acid form, i.e., in hydrogen ($H^+$) form. The Na/T atomic ratio is generally less than 10%, preferably less than 5%, and even more preferably less than 1%.

In contrast, the catalyst that is the object of the invention contains at least one hydro-dehydrogenating element, preferably selected from among the elements of group VIB and group VIII (i.e., metal or compound) of the periodic table and at least one porous mineral matrix.

In the case where the element is at least one metal of group VIII, preferably when it is at least a noble metal and advantageously a noble metal that is selected from the group that is formed by Pt and Pd, it can be introduced into the zeolites, for example, by dry impregnation, by ion exchange or any other method that is known to one skilled in the art, or else it can be introduced into the matrix.

According to a first variant, prior to their shaping, at least one of the zeolites that is described above is subjected to the deposition of at least one metal of group VIII, preferably selected from the group that is formed by platinum and palladium.

Once the metal deposition is carried out, the zeolite is shaped by any technique that is known to one skilled in the art. It can be mixed in particular with a matrix, generally amorphous, for example with a moist alumina gel powder. The mixture is then shaped, for example, by extrusion through a die.

The shaping can be carried out with matrices other than alumina, such as, for example, magnesia, silica-aluminas, natural clays (kaolin, bentonite, sepiolite, attapulgite), silica, titanium oxide, boron oxide, zirconia, aluminum phosphates, titanium phosphates, zirconium phosphates, carbon and mixtures thereof. It is preferred to use matrices that contain alumina, under all of its forms that are known to one skilled in the art, and even more preferably the aluminas, for example gamma-alumina. Techniques other than extrusion, such as pelletizing or sugar-coating, can be used.

It is also advantageously possible to use mixtures of alumina and silica, and mixtures of alumina and silica-alumina.

The catalysts that are obtained by this invention are shaped in the form of grains of various shapes and sizes. They are used in general in the form of cylindrical or multilobar extrudates, such as bilobar, trilobar, multilobar of straight or twisted shape, but can optionally be produced and used in the form of crushed powder, tablets, rings, balls or wheels.

After the shaping stage, the product that is obtained is subjected to a drying stage and then to a calcination stage.

In the case where the hydrogenating metal belongs to group VIII, and preferably is platinum and/or palladium, it can also advantageously be deposited on the substrate after the shaping of the metal-free zeolite by any process that is known to one skilled in the art and that makes possible the deposition of the metal on the molecular sieve. In this case, the substrate is obtained in a way that is similar to the one that is described above.

In the text below, for the zeolitic catalyst, the term substrate will refer to the zeolite mixture (free of metals) plus matrix after shaping, drying and calcination, for example as obtained above.

To deposit the metal on the zeolite, it is possible to use the cationic exchange technique with competition where the competitor is preferably ammonium nitrate, whereby the competition ratio is at least equal to about 20 and advantageously from about 30 to 200. In the case of platinum or palladium, a tetramine complex of platinum or a tetramine complex of palladium is usually used: the latter will then be virtually completely deposited on the zeolite. This cationic exchange technique can also be used to deposit the metal directly on the molecular sieve powder before its optional mixing with a matrix.

The deposition of metal (or metals) of group VIII is followed in general by a calcination in air or oxygen, usually between 300 and 600° C. for 0.5 to 10 hours, preferably between 350° C. and 550° C. for 1 to 4 hours. It is then possible to initiate a reduction under hydrogen, generally at a temperature of between 300 and 600° C. for 1 to 10 hours, preferably the operation will be between 350° and 550° C. for 2 to 5 hours.

It is also possible to deposit the platinum and/or the palladium no longer directly on the zeolite but on the matrix (for example the aluminum binder) of the substrate, before or after the shaping stage, by using an anionic exchange with the hexachloroplatinic acid, the hexachloropalladic acid and/or the palladium chloride in the presence of a competing agent, for example hydrochloric acid. In general, after the platinum and/or palladium are deposited, the catalyst is subjected as above to a calcination then reduced under hydrogen as indicated above.

The content by weight of zeolite, selected from the group that is formed by the zeolites that are cited above, in the hydrodewaxing catalyst, is between 1% and 90%, preferably between 5 and 90%, and even more preferably between 10 and 85% by weight.

The content of noble metal(s) thus optionally introduced, expressed in % by weight relative to the total mass of the catalyst, is generally less than 5%, preferably less than 3%, even more preferably less than 2% and generally less than 1% by weight.

In the case where the catalyst comprises a hydrogenating metal of group VIII, preferably a noble metal and advantageously Pt and/or Pd, the catalyst is generally reduced in the reactor in the presence of hydrogen and under conditions that are well known to one skilled in the art.

In the case where the hydrogenating metal is not a noble metal, the elements of group VIB and group VIII that are optionally introduced into the catalyst according to the invention can be present completely or partially in metallic form and/or oxide form and/or sulfide form.

Among the elements of group VIB, molybdenum and tungsten are preferred.

The element sources of group VIB that can be used are well known to one skilled in the art. For example, among the molybdenum and tungsten sources, it is possible to use oxides and hydroxides, molybdic and tungstic acids and their salts, in particular the ammonium salts such as ammonium molybdate, ammonium heptamolybdate, ammonium tungstate, phosphomolybdic acid, phosphotungstic acid and salts thereof. Ammonium oxides and salts, such as ammonium molybdate, ammonium heptamolybdate and ammonium tungstate are preferably used.

The zeolitic catalyst can contain a non-noble metal of group VIII and preferably cobalt and nickel. Advantageously, the following combinations of non-noble elements of groups VI and VIII are used: nickel-molybdenum, cobalt-molybdenum, iron-molybdenum, iron-tungsten, nickel-tungsten, and cobalt-tungsten, and the preferred combinations are: nickel-molybdenum and nickel-tungsten. It is also possible to use combination of three metals, for example nickel-cobalt-molybdenum.

The element sources of group VIII that can be used are well known to one skilled in the art. For example, nitrates, sulfates, phosphates; halides, for example, chlorides, bromides and fluorides; and carboxylates, for example acetates and carbonates, will be used.

When the hydrogenating function is ensured by a non-noble metal of group VIII or a combination of a non-noble metal of group VIII and a metal of group VIB,
    the composition of the substrate that consists of at least one matrix and zeolites that are described in the invention is the same as the one that is described above, and
    the content by weight of at least one element that is selected from among the non-noble elements of group VIB and group VIII is encompassed between 0.1 and 60%, preferably between 1 and 50%, and even more preferably between 2 and 40%.

Generally, to end the preparation of the catalyst, the moist solid is allowed to stand under a moist atmosphere at a temperature of between 10 and 80° C., then the moist solid that is obtained is dried at a temperature of between 60 and 150° C., and finally the solid that is obtained is calcined at a temperature of between 150 and 800° C., generally between 250 and 600° C.

The catalysts optionally can be subjected to a sulfurization treatment that allows metal sulfide radicals to be transformed, at least in part, before they are brought into contact with the feedstock to be treated. This treatment of activation by sulfurization is well known to one skilled in the art and can be carried out by any method that is already described in the literature.

In the case of the non-noble metals, a standard sulfurization method that is well known to one skilled in the art consists in heating, in the presence of or under a stream of a hydrogen/hydrogen sulfide mixture or else under the stream of pure hydrogen sulfide, to a temperature of between 150 and 800° C., preferably between 250 and 600° C., generally in a flushed-bed reaction zone.

Unexpectedly, said zeolitic catalyst exhibits a dewaxing activity and selectivity (improvement of the pour point) that is more significant than the zeolite-based catalytic formulas (molecular sieves) that are known in the prior art.

The use of the zeolitic catalyst under the conditions that are described above makes possible, in particular, the production of products with a low pour point with good yields and with a high viscosity index in the case of the heaviest fractions that are treated in a facility for production of oil bases.

The Treatment

A residue that is obtained at the end of stage (a) and the distillation and that is advantageous to treat in this hydrodewaxing stage (b) has the following characteristics: It exhibits an initial boiling point that is higher than 340° C. and preferably higher than 370° C., a pour point of at least 15° C., a viscosity index of 35 to 165 (before dewaxing), preferably at least equal to 110, and even more preferably less than 150, a viscosity at 100° C. that is greater than or equal to 3 cSt ($mm^2/S$), an aromatic compound content that is less than 10% by weight, a nitrogen content that is less than 10 ppm by weight, and a sulfur content that is less than 50 ppm by weight or, better, 10 ppm by weight.

The operating conditions in which the catalytic hydrodewaxing stage of the process of the invention is carried out are as follows:
    The reaction temperature is between 200 and 500° C., preferably between 200 and 470° C., advantageously 250 and 430° C.;
    the pressure is between 0.1 and 25 MPa ($10^6$ Pa) and preferably between 1.0 and 20 MPa;
    the hourly volumetric flow rate (vvh expressed by volume of feedstock injected per unit of volume of catalyst and per hour) is between about 0.05 and about 50 and preferably between about 0.1 and about 20 $h^{-1}$, and even more preferably between 0.2 and 10 $h^{-1}$.
    They are selected to obtain the desired pour point.

The contact between the feedstock and the catalyst is carried out in the presence of hydrogen. The hydrogen level that is used and expressed in liters of hydrogen per liter of feedstock is between 50 and about 2000 liters of hydrogen per liter of feedstock and preferably between 100 and 1500 liters of hydrogen per liter of feedstock.

The Effluent that is Obtained

The effluent resulting from hydrodewaxing stage (b) is sent into the distillation train, which preferably integrates an atmospheric distillation and a vacuum distillation, whose purpose is to separate the conversion products with a boiling point of less than 340° C. and preferably less than 370° C. (and including in particular those that are formed during the catalytic hydrodewaxing stage) and to separate the fraction that constitutes the oil base and whose initial boiling point is higher than at least 340° C. and preferably higher than or equal to 370° C.

Furthermore, this vacuum distillation section makes it possible to separate the different oil grades.

Preferably, before being distilled, the effluent resulting from catalytic hydrodewaxing stage (b) is, at least in part and preferably completely, sent to a hydrofinishing catalyst (hydrofinishing) in the presence of hydrogen so as to carry out an intensive hydrogenation of the aromatic compounds that interfere with the stability of the oils and distillates. However, the acidity of the catalyst should be weak enough not to lead to the formation of cracking product with a boiling point that is less than 340° C. so as not to degrade the final yields, in particular of oils.

The catalyst that is used in this hydrofinishing stage comprises at least one metal of group VIII and/or at least one element of group VIB of the periodic table. The strong metallic functions: platinum and/or palladium or nickel-tungsten or nickel-molybdenum combinations, will advantageously be used to carry out an intensive hydrogenation of aromatic compounds.

These metals are deposited and dispersed on an amorphous- or crystalline-oxide-type substrate, such as, for example, aluminas, silicas or silica-aluminas.

The hydrofinishing catalyst (HDF) can also contain at least one element of group VII A of the periodic table. These catalysts preferably contain fluorine and/or chlorine.

The contents by weight of metals are encompassed between 10 and 30% in the case of non-noble metals and less than 2%, preferably between 0.1 and 1.5%, and even more preferably between 0.1 and 1.0% in the case of noble metals.

The total amount of halogen is encompassed between 0.2 and 30% by weight, advantageously 0.01 to 15%, or else 0.01 to 10%, preferably 0.01 to 5%.

Among the catalysts that can be used in this hydrofinishing stage and that lead to excellent performances and in particular for obtaining medicinal oils, it will be possible to cite the catalysts that contain at least one noble metal of group VIII (platinum and VIII, for example) and at least one halogen (chlorine and/or fluorine), whereby the chlorine and fluorine combination is preferred.

The operating conditions in which the hydrofinishing stage of the process of the invention operates are as follows:

The reaction temperature is between 180 and 400° C., preferably between 210 and 350° C., advantageously between 230 and 320° C.;

the pressure is between 0.1 and 25 MPa and preferably between 1.0 and 20 MPa;

the hourly volumetric flow rate (vvh expressed by volume of feedstock injected per unit of volume of catalyst and per hour) is between about 0.05 and about 100 and preferably between about 0.1 and about 30 h$^{-1}$.

The contact between the feedstock and the catalyst is carried out in the presence of hydrogen. The hydrogen level that is used and expressed in liters of hydrogen per liter of feedstock is between 50 and about 2000 liters of hydrogen per liter of feedstock and preferably between 100 and 1500 liters of hydrogen per liter of feedstock. Advantageously, the temperature of the hydrofinishing stage (HDF) is less than the temperature of the catalytic dewaxing stage (HDPC). The difference $T_{HDPC}-T_{HDF}$ is generally encompassed between 20 and 200, and preferably between 30 and 100° C.

The effluent resulting from the HDF is then sent into the distillation train.

The Products

The oil bases that are obtained according to this process have a pour point that is less than −10° C., a VI of more than 95, preferably more than 110, and even more preferably more than 120, a viscosity of at least 3.0 cSt at 100° C., an ASTM color that is less than 1 and a UV stability such that the deepening of the ASTM color is between 0 and 4 and preferably between 0.5 and 2.5.

The UV stability test, adapted to the ASTM D925-55 and D1148-55 processes, provides a quick method for comparing the stability of the lubricating oils that are exposed to an ultraviolet ray source. The test chamber consists of a metallic chamber that is equipped with a turntable that receives the oil samples. An ampoule that produces the same ultraviolet rays as those of sunlight and placed at the top of the test chamber is directed toward the bottom on the samples. Among the samples is included a standard oil with known UV characteristics. The ASTM D1500 color of the samples is determined at t=0 then after 45 hours of exposure at 55° C. The results are transcribed for the standard sample and the samples of the test as follows:

a) ASTM D1500 initial color,
b) ASTM D1500 final color,
c) deepening of the color,
d) cloudiness,
e) precipitated.

Another advantage of the process according to the invention is that it is possible to achieve very low aromatic compound contents, less than 2% by weight, preferably 1% by weight and, better, less than 0.05% by weight) and even to go so far as to the production of white oils of a medicinal quality that have aromatic compound contents of less than 0.01% by weight. These oils have UV absorbance values at 275, 295 and 300 nanometers respectively less than 0.8, 0.4 and 0.3 (ASTM D2008 method) and a Saybolt color of between 0 and 30.

Particularly advantageously, therefore, the process according to the invention also makes it possible to obtain medicinal white oils. The medicinal white oils are mineral oils that are obtained by an intensive petroleum refining; their quality is subjected to different regulations that aim at ensuring their safety for pharmaceutical applications; they are devoid of toxicity and are characterized by their density and their viscosity. The medicinal white oils essentially comprise saturated hydrocarbons; they are chemically inert and their aromatic hydrocarbon content is low. Special attention is brought to bear on aromatic compounds and in particular on 6 polycyclic aromatic hydrocarbons (P.A.H. for the English abbreviation of polycyclic aromatic hydrocarbons) that are toxic and present at concentrations of one part per billion by weight of aromatic compounds in the white oil. The monitoring of the total aromatic compound content can be carried out by the ASTM D 2008 method; this UV adsorption test at 275, 292 and 300 nanometers makes it possible to monitor a lower absorbance respectively at 0.8, 0.4 and 0.3 (i.e., the white oils have aromatic compound contents that are less than 0.01% by weight). These measurements are carried out with concentrations of 1 g of oil per liter in a 1 cm tank. The marketed white oils differ by their viscosity but also by their crude of origin that can be paraffinic or naphthenic; these two parameters will induce differences both in the physico-chemical properties of the white oils that are being considered but also in their chemical composition.

Currently, the oil fractions, whether they are obtained from the direct distillation of a crude petroleum followed by an extraction of aromatic compounds by a solvent or whether they are obtained from a catalytic hydrorefining or hydrocracking process, also contain non-negligible amounts of aromatic compounds. In the current legislative framework of the majority of industrialized countries, the so-called medicinal white oils should have an aromatic compound content of less than a threshold that is imposed by the legislation of each country. The absence of these aromatic compounds in the oil fractions is reflected by a Saybolt color specification that is to be approximately at least 30 (+30), a UV adsorption maximum specification that should be less than 1.60 to 275 nm on a pure product in a 1 centimeter tank, and a maximum absorption specification of extraction products by DMSO that is to be less than 0.1 for the U.S. market (Food and Drug Administration, standard No. 1211145). This last test consists in extracting specifically polycyclic aromatic hydrocarbons with the help of a polar solvent, often DMSO, and in monitoring their content in the extract by a UV absorption measurement in the 260-350 nm range.

BRIEF DESCRIPTION OF DRAWINGS

The invention will be illustrated with FIGS. 1 to 3, representing different embodiments for the treatment of a feedstock, for example a 380° C.+ fraction that is obtained from a hydrocracking stage and that is thus called a hydrocracking residue.

In FIG. 1, the feedstock enters via pipe (1) into a hydrotreatment zone (2) (which can consist of one or more reactors and can comprise one or more catalytic beds of one or more catalysts), in which the hydrogen enters (for example via pipe (3)) and where the hydrotreatment stage is carried out.

Figure 1:
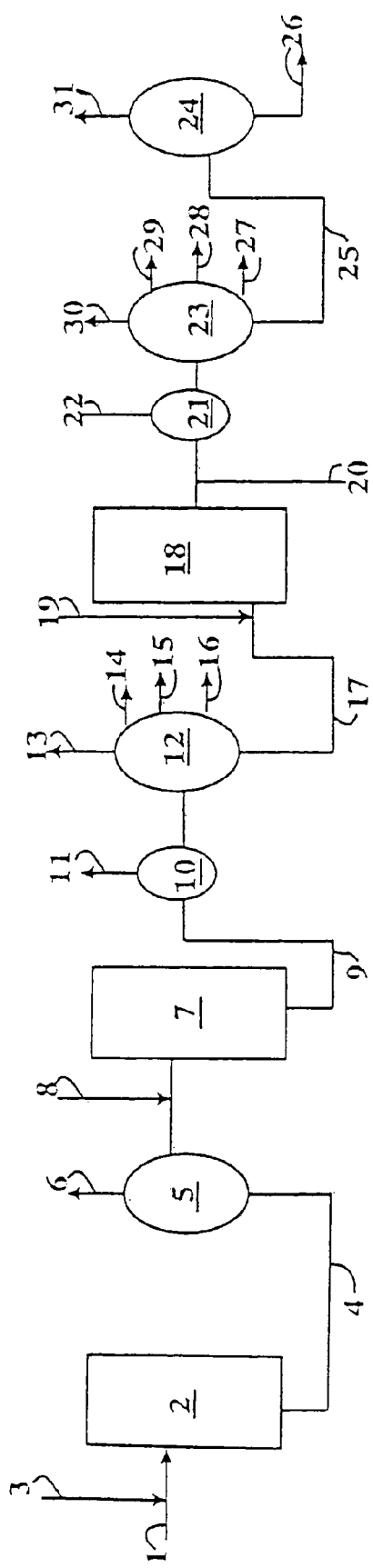
FIG. 1

The hydrotreated feedstock is transferred via pipe (4) into pretreatment stage zone (7) (which can consist of one or more reactors and can comprise one or more catalytic beds of one or more catalysts) where stage (a) of the pretreatment stage is carried out in the presence of hydrogen. Hydrogen can be brought via pipe (8).

In this figure, before being introduced into zone (7), a large portion of ammonia and hydrogen sulfide H$_2$S are removed via pipe (6) from the feedstock to be hydroisomerized in phase separator tank (5) if the feedstock that enters via pipe 1 contains sulfur and nitrogen.

The effluent that is obtained from zone (7) is sent via a pipe (9) into a phase separator tank (10) for separation of the hydrogen that is extracted via a pipe (11); the effluent is then distilled at atmospheric pressure in column (12) from which a light fraction that contains the compounds with at most 4 carbon atoms and those boiling below is withdrawn at the top via pipe (13).

At least one gasoline fraction (14) and at least one middle distillate fraction (kerosene (15) and gas oil (16), for example), are also obtained.

At the bottom of the column, there is obtained a fraction that contains compounds having a boiling point higher than at least 340° C. This fraction is evacuated via pipe (17) to catalytic dewaxing zone (18).

A catalytic dewaxing zone (18) (comprising one or more reactors, one or more catalytic beds of one or more catalysts) also receives hydrogen via a pipe (19) for carrying out stage (b) of the process.

The effluent that is obtained and that exits via pipe (20) is separated in a distillation train that, in addition to phase separator tank (21) for separating the hydrogen via a pipe (22), comprises an atmospheric distillation column (23) and a vacuum distillation column (24) that treats the atmospheric distillation residue having an initial boiling point of higher than 340° C. that is transferred via pipe (25).

Obtained as products at the end of the distillations are an oil fraction (pipe 26) and lower-boiling fractions, such as gas oil (pipe 27), kerosene (pipe 28), and gasoline (pipe 29), whereby the light gases are eliminated via pipe (30) of the atmospheric column and via pipe (31) by the vacuum distillation column.

The effluent that exits via pipe (20) can also advantageously be sent into a hydrofinishing zone (not shown) (comprising one or more reactors, and one or more catalytic beds of one or more catalysts) before being injected into the separation train. Hydrogen can be added, if necessary, in this zone. The exiting effluent is then transferred into tank (21) and the distillation train that is described.

To simplify the figure, the hydrogen recycling is not shown, whether at phase separating tank (10) toward hydrotreatment and/or the pretreatment stage and/or at tank phase separator (21) toward dewaxing and/or hydrofinishing.

FIG. 2

The references of FIG. 1 that are incorporated here will be recognized. In this embodiment, the entire effluent that is obtained from pretreatment-conversion stage (stage a) zone (7) passes directly via pipe (9) into catalytic dewaxing zone (18) (stage b).

FIG. 3

In the same way as above, the reference numerals have the same meaning as in FIG. 1. In this embodiment, the effluent that is obtained from pretreatment-conversion stage (stage a) zone (7) undergoes in vessel (32), for example, a flash-separation of at least a portion of the light gases (hydrogen and hydrocarbon-containing compounds with at most 4 carbon atoms). The separated gases are extracted via pipe (33), and the residual effluent is sent via pipe (34) into catalytic dewaxing zone (18).

Figure 2:
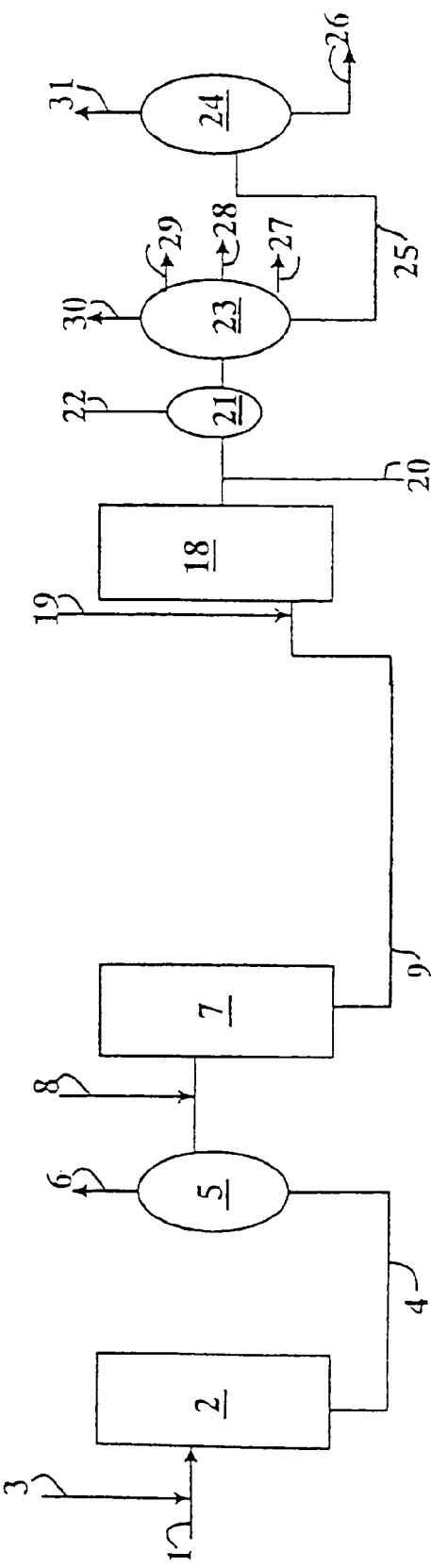
Figure 3:
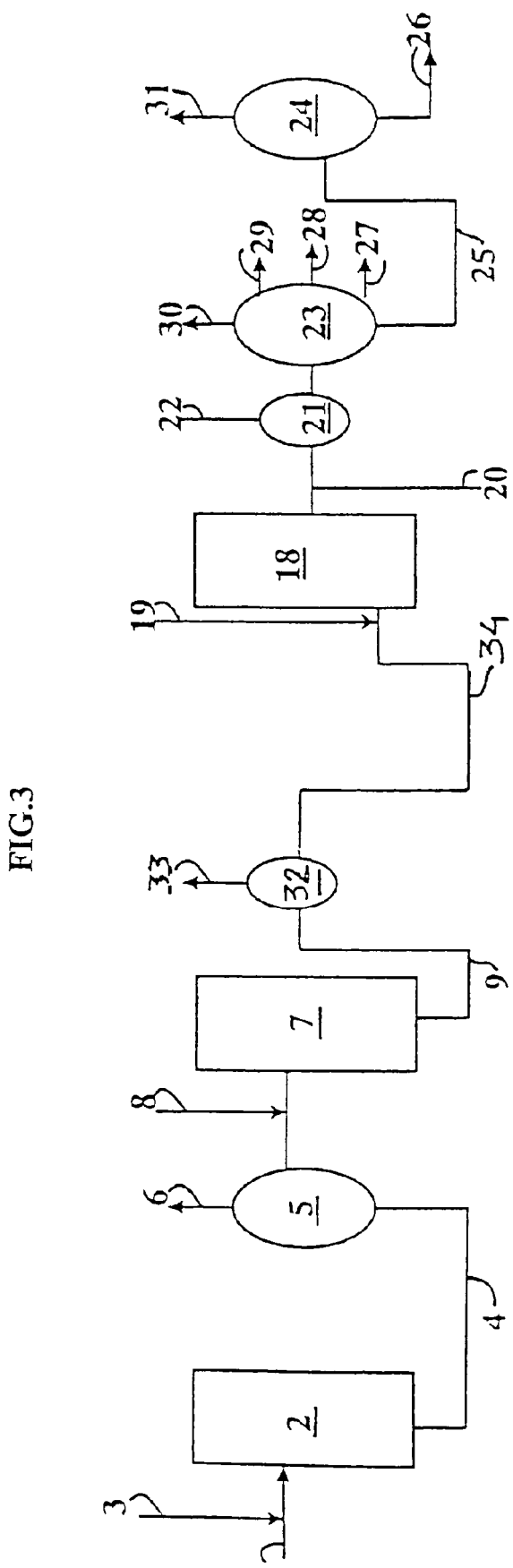

It will be noted that in FIGS. 1, 2 and 3, a separation was called for on the effluent that is obtained from catalytic dewaxing zone (18). This separation cannot be used when said effluent is treated subsequently in a hydrofinishing zone, whereby the separation then takes place well after said treatment.

It involves here the separation that is carried out in the tanks or columns 21, 23, and 24.

EXAMPLE 1

Preparation of Catalysts C1, C2 et C3 According to the Invention

Catalysts C1 and C3 are pretreatment catalysts according to the invention. Catalyst C2 is a zeolitic dewaxing catalyst.

Catalyst C1 is prepared from a silica-alumina (SAl) according to the invention. The aluminum hydroxide powder was prepared according to the process that is described in Patent WO 00/01617. This powder is mixed with a silica soil that is prepared by decationizing resin exchange, then filtered. The composition of the mixed substrate in anhydrous product is, at this stage, 60% $Al_2O_3$-40% $SiO_2$. Shaping is carried out in the presence of 15% nitric acid relative to the anhydrous product. The mixing is done in a Z-arm mixing machine. The extrusion is carried out by passage of the paste through a die that is equipped with orifices with diameters of 1.4 mm. The extrudates that are thus obtained are dried at 150° C., then calcined at 550° C., then calcined at 750° C. in the presence of water vapor.

The characteristics of the SA-1 substrate are as follows:

The composition of the substrate is 60% $Al_2O_3$-40% $SiO_2$.

The BET surface area is 248 $m^2/g$.

The total pore volume, measured by nitrogen adsorption, is 0.46 ml/g.

The mean pore diameter, measured by mercury porosimetry, is 69 Å.

The ratio between volume V2, measured by mercury porosimetry, encompassed between $D_{mean}$-30 Å and $D_{mean}$+30 Å, to the total mercury volume is 0.9.

Volume V3, measured by mercury porosimetry, encompassed in the pores with diameters of more than $D_{mean}$+30 Å, is 0.0225 ml/g.

Volume V6, measured by mercury porosimetry, encompassed in the pores with diameters of more than $D_{mean}$+15 Å is 0.031 ml/g.

The ratio between the adsorption surface area and the BET surface area is 0.83.

The pore volume, measured by mercury porosimetry, encompassed in the pores with diameters of more than 140 Å, is 0.012 ml/g.

The pore volume, measured by mercury porosimetry, encompassed in the pores with diameters of more than 160 Å, is 0.0106 ml/g.

The pore volume, measured by mercury porosimetry, encompassed in the pores with diameters of more than 200 Å, is 0.0066 ml/g.

The pore volume, measured by mercury porosimetry, encompassed in the pores with diameters of more than 500 Å, is 0.001 ml/g.

The B/L ratio of the substrate is 0.12.

The packing density of the catalyst is 1.08 $g/cm^3$.

The X diffraction diagram contains at least the characteristic main gamma lines and in particular it contains the peaks at one d encompassed between 1.39 and 1.40 Å and at one d encompassed between 1.97 Å and 2 Å.

The atomic sodium content is 200+/-20 ppm. The atomic sulfur content is 800 ppm.

The NMR MAS spectra of the solid of $^{27}Al$ of the catalysts show two clusters of separate peaks. A first type of aluminum whose maximum resonates toward 10 ppm extends between -100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 70%.

The catalyst contains two silico-aluminum zones, whereby said zones have Si/Al ratios that are less than or greater than the overall Si/Al ratio that is determined by X fluorescence. One of the zones has an Si/Al ratio that is determined by MET of 0.25, and the other zone has an Si/Al ratio that is determined by MET of 5.8.

Catalyst C1 is obtained after impregnation of the noble metal on the SA-1 substrate. Platinum salt $H_2PtCl_6$ is dissolved in a solution volume that corresponds to the total pore volume that is to be impregnated. The solid is then calcined for two hours in air at 500° C. The platinum content is 0.45% by weight. Measured on the catalyst, the BET surface area is equal to 243 $m^2/g$. The dispersion of the platinum that is measured by $H_2/O_2$ titration is 72%.

Catalyst C3 is prepared from a silica-alumina according to the invention (SA-3), whose preparation and shaping are described below.

An alumina hydrate is prepared according to the teachings of U.S. Pat. No. 3,124,418. After filtration, the freshly prepared precipitate is mixed with a silicic acid solution that is prepared by decationizing resin exchange. The proportions of the two solutions are adjusted in such a way as to reach a composition of 70% $Al_2O_3$-30% $SiO_2$ on the final substrate. This mixture is quickly homogenized in a commercial colloidal mill in the presence of nitric acid such that the nitric acid content of the suspension at the outlet of the mill is 8% relative to the silica-alumina mixed solid. Then, the suspension is routinely dried in a sprayer conventionally from 300° C. to 60° C. The thus prepared powder is shaped in a Z arm in the presence of 8% nitric acid relative to the anhydrous product. The extrusion is carried out by passage of the paste through a die that is equipped with 1.4 mm-diameter orifices. The thus obtained extrudates are dried at 150° C., then calcined at 550° C., then calcined at 750° C. in the presence of water vapor.

The characteristics of substrate SA-3 are as follows:

The composition of the silica-alumina substrate is 69.5% $Al_2O_3$ and 30.5% $SiO_2$.

The BET surface area is 250 $m^2/g$.

The total pore volume, measured by nitrogen adsorption, is 0.45 ml/g.

The mean pore diameter, measured by mercury porosimetry, is 70 Å.

The ratio between volume V2, measured by mercury porosimetry, encompassed between $D_{mean}$-30 Å and $D_{mean}$+30 Å, to the total mercury volume is 0.9.

Volume V3, measured by mercury porosimetry, encompassed in the pores with diameters of more than $D_{mean}$+30 Å, is 0.021 ml/g.

Volume V6, measured by mercury porosimetry, encompassed in the pores with diameters of more than $D_{mean}$+15 Å, is 0.035 ml/g.

The ratio between the adsorption surface area and the BET surface area is 0.82.

The pore volume, measured by mercury porosimetry, encompassed in the pores with diameters of more than 140 Å, is 0.015 ml/g.

The pore volume, measured by mercury porosimetry, encompassed in the pores with diameters of more than 160 Å, is 0.01 ml/g.

The pore volume, measured by mercury porosimetry, encompassed in the pores with diameters of more than 200 Å, is 0.007 ml/g.

The pore volume, measured by mercury porosimetry, encompassed in the pores with diameters of more than 500 Å, is 0.001 ml/g.

The X diffraction diagram contains the main lines that are characteristic of the gamma-alumina, and in particular it contains the peaks at one d encompassed between 1.39 and 1.40 Å and at one d encompassed between 1.97 Å and 2.00 Å.

The B/L ratio of the substrate is 0.11.

The packing density of the catalyst is 1.06 $g/cm^3$.

The atomic sodium content is 250+/−20 ppm. The atomic sulfur content is 2000 ppm.

The NMR MAS spectra of the solid of $^{27}Al$ of the catalysts show two clusters of separate peaks. A first type of aluminum whose maximum resonates toward 10 ppm extends between −100 and 20 ppm. The position of the maximum suggests that these radicals are essentially of $Al_{VI}$ type (octahedral). A second type of minority aluminum whose maximum resonates toward 60 ppm extends between 20 and 100 ppm. This cluster can be decomposed into at least two radicals. The predominant radical of this cluster would correspond to $Al_{IV}$ atoms (tetrahedral). The proportion of octahedral $Al_{VI}$ is 69%.

The catalyst contains a single silico-aluminum zone with an Si/Al ratio that is determined by a MET microprobe of 0.37.

Catalyst C3 is obtained after impregnation of the noble metal on the SA-3 substrate that is obtained and described above. Platinum salt $H_2PtCl_6$ is dissolved in a solution volume that corresponds to the total pore volume that is to be impregnated. The solid is then calcined for 2 hours in air at 500° C. The platinum content is 0.49% by weight. Measured on the catalyst, the BET surface area is equal to 244 m²/g. The dispersion of the platinum that is measured by $H_2/O_2$ titration is 82%.

Hydrodewaxing catalyst C2 comprises a ferrierite zeolite. This catalyst is obtained according to the operating procedure that is described below.

The ferrierite zeolite is subjected to an ionic exchange in a 10N $NH_4NO_3$ solution at about 100° C. for 4 hours.

The ferrierite zeolite that is thus obtained exhibits an Si/Al=10.4 ratio and an Na/Al=0.002 ratio.

Then, 75 grams of ferrierite zeolite in powder form is mixed with 25 grams of an SB3-type alumina gel (provided by the Condea Company) that was peptized in advance with an aqueous solution that contains nitric acid at 68% by weight and mixed for 15 minutes. The mixed paste (alumina gel+zeolite) is then extruded through a dye with a diameter of 1.4 mm. The thus obtained extrudates are calcined at 500° C. for 2 hours in air. The content by weight of ferrierite zeolite in the substrate extrudates is 75%.

Then, the substrate extrudates are subjected to a dry-impregnation stage by an aqueous solution of the platinum salt $Pt(NH_3)_4^{2+}$, 2OH—, then calcined in dry air at 550° C. The content by weight of platinum of catalyst C2 that is thus obtained is 0.51%.

EXAMPLE 2

Evaluation of Catalysts C1 and C3 in a Pretreatment Stage of a Hydrorefined Vacuum Distillate Followed by a Separation Catalysts C1 and C3, whose preparation is described in Example 1, are used to pretreat a feedstock that is a vacuum gas oil (VGO) that was hydrorefined in advance for the purpose of obtaining oil bases. To be able to directly use the pretreatment stage catalysts, the feedstock therefore was hydrorefined in advance, and the main characteristics of the feedstock obtained are recorded in Table 1 below:

TABLE 1

| Characteristics of the Feedstock | |
|---|---|
| Sulfur content (ppm by weight) | 3 |
| Nitrogen content (ppm by weight) | 1 |
| Starting point | 335° C. |
| 10% point | 397° C. |

TABLE 1-continued

| Characteristics of the Feedstock | |
|---|---|
| 50% point | 459° C. |
| 90% point | 537° C. |
| End point | 600° C. |
| Pour point | +42° C. |
| VI after solvent-dewaxing Methyl isobutyl ketone (MIBC) (−20° C.) | 105 |

This feedstock was used to evaluate catalysts C1 and C3 (stage (a)) and to prepare the feedstock that will then be catalytically hydrodewaxed in Example 3.

The catalytic test unit comprises a fixed-bed reactor, with upward circulation of the feedstock ("up-flow"), into which is introduced 80 ml of catalyst C1 or C3. This catalyst is then subjected to a pure hydrogen atmosphere at a pressure of 12 MPa so as to ensure the reduction of the platinum oxide into metallic platinum, then the feedstock is finally injected. The total pressure is 12 MPa, the hydrogen flow rate is 1000 liters of gaseous hydrogen per liter of injected feedstock, the hourly volumetric flow rate is 1.1 h$^{-1}$, and the reaction temperature is 330° C. in the case of catalyst C1 and 325° C. in the case of catalyst C3. After the reaction, the effluents are fractionated into light products (PI-150° C. gasoline), middle distillates (150-380° C.) and residue (380$^{+°}$ C.).

The net conversions of the feedstock into products that have boiling points of less than 380° C. that are thus obtained under these conditions as well as the VI of the 380° C.+ fraction (measured after solvent dewaxing at −20° C., by methyl isobutyl ketone (MIBC)), and the pour point of the non-dewaxed 380° C.+ fraction are provided in Table 2.

TABLE 2

| | 1 Feedstock = Hydrocracking Residue | 2 Stage (a) (Catalyst C1 Pretreatment Stage) | 3 Stage (a) (Catalyst C3 Pretreatment Stage) |
|---|---|---|---|
| Reaction Temperature ° C. | / | 330 | 325 |
| P Total (bar) | / | 120 | 120 |
| Conversion of 380° C.-(% by Weight) | / | 32 | 28 |
| Sulfur (ppm by weight) | 3 | / | / |
| Nitrogen (ppm by weight) | 1 | / | / |
| 380° C.+ Fraction | | | |
| Pour Point (° C.) | +42 | +34 | +36 |
| 380° C.+ Fraction After Solvent Dewaxing (MIBC) | 380° C.+ Fraction of the Solvent-Dewaxed Hydrocracking Residue | 380° C.+ Hydroisomerized and Solvent-Dewaxed Fraction | 380° C.+ Hydroisomerized and Solvent-Dewaxed Fraction |
| VI | 105 | 129 | 126 |
| Pour Point (° C.) | −20 | −20 | −20 |

These results show that for conversion rates on the order of 30%, it is possible to increase the VI of the 380° C.+ fraction (obtained after solvent dewaxing (−20° C.) by methyl isobutyl ketone (MIBC). In the case of catalyst C1, the gain of VI is 24 points, and in the case of catalyst C3, the gain is 21 points. By contrast, the pour point of the 380° C.+ fraction, as obtained at the end of the catalyst C1 or C3 pretreatment stage, was only slightly reduced.

The 250-380° C. fraction that corresponds to a gas oil fraction and that results from the converting pretreatment stage, on C1, of the hydrocracking residue, exhibits a pour point of −18° C. and a cetane number of 60, which is actually an excellent gas oil. In the case of pretreatment catalyst C3, this fraction exhibits a pour point of −15° C. and a cetane number of 60.

EXAMPLE 3

Catalytic Hydrodewaxing on Catalyst C2, Pretreated Feedstocks on Catalysts C1 and C3 and Prepared in Example 2, Followed by a Separation and a Hydrofinishing Stage The pretreated residues (380° C.+ fraction) on catalyst C1 or C3 and prepared in Example 2 are then dewaxed and hydrofinished, separately, in a unit that comprises two fixed-bed reactors with upward circulation of the feedstock ("up-flow").

80 ml of hydrodewaxing catalyst C2, prepared in Example 1, is introduced into the first reactor, and a hydrofinishing catalyst that contains 1% by weight of Pt, 1% by weight of F and 1% by weight of C1 on alumina is introduced into the second reactor.

The catalysts are then subjected to a pure hydrogen atmosphere at a pressure of 12 MPa so as to ensure the reduction of platinum oxide into metallic platinum, and then the pretreated feedstocks (380° C.+ fraction produced in Example 2) are injected. Two separate tests were carried out so as to hydrodewax them and to hydrofinish them.

For each of these tests, the total pressure is 12 MPa; the hydrogen flow rate is 1000 liters of gaseous hydrogen per liter of feedstock injected, the hourly volumetric flow rate in the first reactor that contains C2 is 1.1 h$^{-1}$; and in the second reactor that contains the hydrofinishing catalyst, the total pressure is the same except for the pressure drops; and the entire effluent that is obtained from the first reactor circulates at a volumetric flow rate of 0.5 h−1. The temperatures of the hydrodewaxing and hydrofinishing catalysts are provided in Table 3.

After the reaction, the effluents are fractionated into light products (PI–150° C. gasoline), middle distillates (150-380° C.) and residue (380° C.$^+$).

The effluent is recovered and then vacuum-distilled. The oil fraction yields (380° C.+ fraction) as well as the characteristics of the 380° C.+ residue are recorded in Table 3 for the feedstock, for the 380° C.+ fraction that is obtained from the converting pretreatment stage and for the 380° C.+ fraction that is obtained from the catalytic and hydrofinishing dewaxing stage.

TABLE 3

| | 1<br>Stage (b)<br>(Catalytic<br>Hydrodewaxing on C2 +<br>Catalytic Hydrofinishing)<br>of the 380° C.+ Fraction<br>that is Obtained from the<br>Catalyst C1 Pretreatment | | 2<br>Stage (b)<br>(Catalytic<br>Hydrodewaxing on C2 +<br>Catalytic Hydrofinishing)<br>of the 380° C.+ Fraction<br>that is Obtained from the<br>Catalyst C3 Pretreatment | |
|---|---|---|---|---|
| Catalysts | C2 | Hydrofinishing | C2 | Hydrofinishing |
| Reaction Temperature ° C. | 310 | 220 | 305 | 220 |

TABLE 3-continued

| P Total (bar) | 120 | 120 | 120 | 120 |
|---|---|---|---|---|
| Conversion of 380° C.-(% by Weight) | / | | / | |
| 380° C.+ Fraction | | | | |
| Pour Point (° C.) | −24 | | −20 | |

| 380° C.+ Fraction After Treatment | Catalytically Hydroisomerized, Dewaxed and Hydrofinished 380° C.+ Fraction | Catalytically Hydroisomerized, Dewaxed and Hydrofinished 380° C.+ Fraction |
|---|---|---|
| VI | 128 | 124 |
| Pour Point (° C.) | −24 | −20 |
| Saybolt Color | +30 | +30 |
| UV Absorption (D2008) | | |
| 260-280 nm | 0.0005 | 0.0004 |
| 280-290 nm | 0.0004 | 0.0005 |
| 290-300 nm | 0.0003 | 0.0004 |
| 300-360 nm | 0.0002 | 0.0002 |
| 360-400 nm | <0.0001 | <0.0001 |
| 300-330 nm | 0.0002 | 0.0003 |
| 330-350 nm | <0.0001 | <0.0001 |

This example demonstrates that the combination of a converting pretreatment stage (stage a) and a catalytic dewaxing stage, followed by a hydrofinishing stage (stage b), leads to high quality products. In particular, it shows that stage (a), on the catalysts according to the invention (C1 and C3), makes it possible to increase the viscosity index of the oil fraction (380° C.+) from respectively 24 and 21 points without, by contrast, adequately lowering the pour point (cf. Table 2, columns 2 and 3). This reduction is carried out during stage (b) on the catalytic dewaxing catalyst that makes it possible to achieve a pour point of −24° C. and −20° C. respectively obtained in the fractions that are obtained from the C1 and C3 pretreatment stages. The VI gains in the 380° C.+ fraction after stages (a) and (b) are respectively 23 points if pretreatment stage (a) has been carried out on catalyst C1 and 19 points if it was carried out on catalyst C3. Furthermore, the hydrofinishing catalyst makes it possible to achieve in the cases a Saybolt color of +30 and UV absorption (D2008) that impart to the product the quality of medicinal oil (cf. Table 3, columns 1 and 2).

This process also looks like a very flexible process that makes it possible to achieve a wide range of yields and qualities of oils and gas oils because of the possibility of modulating the viscosity index (or conversion) on the catalyst of stage (a) of the pretreatment-conversion stage both with and without the presence of a distillation after stage (a).

Stage (a) thus made it possible to bring the VI to a high level and thus to compensate in part for the loss of VI produced during the catalytic dewaxing stage.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius and, all parts and percentages are by weight, unless otherwise indicated.

The entire disclosure[s] of all applications, patents and publications, cited herein and of corresponding FRENCH application No. 0213638, filed 30 Oct. 2002, is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of oils starting from a hydrocarbon-containing feedstock that has a sulfur content of less than 1000 ppm by weight, a nitrogen content of less than 200 ppm by weight, a metal content of less than 50 ppm by weight, whereby said process comprises the following successive stages after an optional hydrotreatment of the feedstock:
(a) converting pretreatment of the feedstock to effect hydroisomerization and hydrocracking reactions, whereby said stage takes place at a temperature of 200-500° C., under a pressure of 5-25 MPa, with a volumetric flow rate of 0.1-5 $h^{-1}$, in the presence of hydrogen, and in the presence of a bifunctional catalyst that contains at least one noble metal of group VIII that is deposited on a non-zeolitic silica-alumina-based substrate that has a silica ($SiO_2$) content by mass that is more than 10% by weight and less than or equal to 80% by weight, whereby said catalyst has the following characteristics:

a mean pore diameter, measured by mercury porosimetry, encompassed between 20 and 140 Å, a total pore volume, measured by mercury porosimetry, encompassed between 0.1 ml/g and 0.6 ml/g, a total pore volume, measured by nitrogen porosimetry, encompassed between 0.1 ml/g and 0.6 ml/g, a BET specific surface area encompassed between 100 and 500 $m^2/g$, a pore volume, measured by mercury porosimetry, encompassed in the pores with diameters of more than 140 Å, of less than 0.1 ml/g, a pore volume, measured by mercury porosimetry, encompassed in the pores with diameters of more than 160 Å, of less than 0.1 ml/g, a pore volume, measured by mercury porosimetry, encompassed in the pores with diameters of more than 200 Å, of less than 0.1 ml/g, a pore volume, measured by mercury porosimetry, encompassed in the pores with diameters of more than 500 Å, of less than 0.01 ml/g, an X ray diffraction diagram that contains at least the main lines that are characteristic of at least one of the transition aluminas contained in the group that consists of the alpha, rho, chi, eta, gamma, kappa, theta and delta aluminas, a pore distribution, such that the ratio between volume V2, measured by mercury porosimetry, encompassed between $D_{mean}-30$ Å and $D_{mean}-30$ Å, to the total mercury volume is more than 0.6, that volume V3, measured by mercury porosimetry, encompassed in the pores with diameters of more than $D_{mean}+30$ Å, is less than 0.1 ml/g, that volume V6, measured by mercury porosimetry, encompassed in the pores with diameters of more than $D_{mean}+15$ Å, is less than 0.2 ml/g, and said non-zeolitic silica-alumina substrate comprises at least two silico-aluminum zones that have Si/Al ratios that are less than or greater than the overall Si/Al ratio that is determined by X ray fluorescence;

(b) catalytic dewaxing of at least a portion of resultant effluent from stage a), carried out at a temperature of 200-500° C., under a pressure of 1-25 MPa, with an hourly volumetric flow rate of 0.05-50 $h^{-1}$, in the presence of 50-2000 liters of hydrogen/liter of effluent that enters stage b and in the presence of a catalyst that comprises at least one hydro-dehydrogenating element and at least one molecular sieve.

2. A process according to claim 1 wherein the converting pretreatment catalyst comprise proportion of the octahedral $Al_{VI}$ determined by analysis of the NMR MAS spectra of the solid of $^{27}Al$ of greater than 50%.

3. A process according to claim 1, in which the noble metal of the converting pretreatment catalyst is platinum and/or palladium.

4. A process according to claim 1, in which the pretreatment catalyst is such that the packing density is greater than 0.85 $g/cm_3$.

5. A process according to claim 1, in which the entire effluent of converting pretreatment stage (a) is treated in dewaxing stage (b).

6. A process according to claim 1, in which the effluent that is obtained from stage (a) is distilled so as to separate the light gases and at least one residue that contains the compounds with a boiling point that is higher than at least 340° C., and said residue is subjected to stage (b).

7. A process according to claim 1, in which the effluent that is obtained from stage (b) is subjected to a distillation stage so as to separate an oil that contains the compounds with a boiling point that is higher than at least 340° C.

8. A process according to claim 7, wherein said distillation comprises an atmospheric distillation followed by a vacuum distillation of the atmospheric residue.

9. A process according to claim 1, in which the feedstock that is subjected to stage (a) previously underwent said hydrotreatment and then optionally a separation of water, ammonia, and hydrogen sulfide.

10. A process according to claim 1, in which the catalyst of stage (b) is based on zeolite that is selected from the group that is formed by TON-structural-type zeolites (theta-1, ISI-1, ZSM-22, KZ-2, and NU-10), and the zeolites ZSM-48, ZBM-30, EU-2, EU-11, ferrierite, EU-1 and EU-13.

11. A process according to claim 1, in which the effluent that is obtained from stage (b) is subjected to a hydrofinishing stage before being distilled.

12. A process according to claim 1, in which the treated hydrocarbon-containing feedstock contains at least 20% by volume of compounds that boil above 340° C.

13. A process according to claim 1, in which the hydrocarbon-containing feedstock is selected from the group that is formed by vacuum distillates that are obtained from the direct distillation of the crude, vacuum distillates that are obtained from conversion units, vacuum distillates that are obtained from units for aromatic compound extraction, vacuum distillates that are obtained from desulfurization or hydroconversion of atmospheric residues and/or vacuum residues, deasphalted oils, hydrocracking residues, vacuum distillates that have undergone a hydrorefining stage, lubricating oil bases, polyalpha-olefins with a high pour point or any mixture of said feedstocks.

14. A process according to claim 1 wherein said converting pretreatment catalyst comprises silica-alumina-based non-zeolitic substrate having the following characteristics:

a content by mass of silica (SiO$_2$) of more than 10% by weight and less than or equal to 80% by weight of silica (SiO$_2$), a mean pore diameter, measured by mercury porosimetry, encompassed between 20 and 140 Å, a total pore volume, measured by mercury porosimetry, encompassed between 0.1 ml/g and 0.6 ml/g, a total pore volume, measured by nitrogen porosimetry, encompassed between 0.1 ml/g and 0.6 ml/g, a BET specific surface area of between 150 and 500 m$^2$/g, a pore volume, measured by mercury porosimetry, encompassed in the pores with diameters of more than 140 Å, of less than 0.1 ml/g, a pore volume, measured by mercury porosimetry, encompassed in the pores with diameters of more than 160 Å, of less than 0.1 ml/g, a pore volume, measured by mercury porosimetry, encompassed in the pores with diameters of more than 200 Å, of less than 0.1 ml/g, a pore volume, measured by mercury porosimetry, encompassed in the pores with diameters of more than 500 Å, of less than 0.01 ml/g, an X ray diffraction diagram that contains at least the main lines that are characteristic of at least one of the transition aluminas contained in the group that consists of the rho, chi, eta, gamma, kappa, theta and delta aluminas, a pore distribution, such that the ratio between volume V2, measured by mercury porosimetry, encompassed between D$_{mean}$−30 Å and D$_{mean}$+30 Å, to the total mercury volume is more than 0.6, that volume V3, measured by mercury porosimetry, encompassed in the pores with diameters of more than D$_{mean}$+30 Å, is less than 0.1 ml/g, that volume V6, measured by mercury porosimetry, encompassed in the pores with diameters of more than D$_{mean}$+15 Å, is less than 0.2 ml/g.

15. A process according to claim 1 wherein said non-zeolitic catalyst substrate has packing density, after calcination, of higher than 0.65 g/cm$^3$.

16. A process according to claim 1 wherein said non-zeolitic catalyst substrate has an acidity that is measured by IR tracking of the thermodesorption of the pyridine is such that the B/L ratio is between 0.05 and 1.

* * * * *

UNITED STATES PATENT AND TRADEMARK OFFICE
CERTIFICATE OF CORRECTION

| | |
|---|---|
| PATENT NO. | : 7,250,106 B2 |
| APPLICATION NO. | : 10/696548 |
| DATED | : July 31, 2007 |
| INVENTOR(S) | : Eric Benazzi |

Page 1 of 1

It is certified that error appears in the above-identified patent and that said Letters Patent is hereby corrected as shown below:

Column 39, line 61 claim 1 reads "$D_{mean}$ - 30 Å and $D_{mean}$ - 30 Å" should read -- $D_{mean}$ - 30 Å and $D_{mean}$ + 30 Å --

Column 40, line 22 claim 4 reads "$cm_3$" should read -- $cm^3$ --

Signed and Sealed this

Fourth Day of March, 2008

JON W. DUDAS
*Director of the United States Patent and Trademark Office*